United States Patent [19]
Powell

[11] Patent Number: 5,890,135
[45] Date of Patent: Mar. 30, 1999

[54] SYSTEM AND METHOD FOR DISPLAYING PRODUCT INFORMATION IN A RETAIL SYSTEM

[76] Inventor: Ken R. Powell, P.O. Box 6265, Athens, Ga. 30604

[21] Appl. No.: 603,483

[22] Filed: Feb. 20, 1996

[51] Int. Cl.$^6$ .................................................. G06F 17/60
[52] U.S. Cl. .............................. 705/14; 235/383; 705/16; 705/400
[58] Field of Search ..................... 235/375, 383, 235/385; 364/400; 395/200.3, 200.31, 200.43, 200.6; 705/10, 14, 20, 23, 24, 400

[56] References Cited

U.S. PATENT DOCUMENTS

| | | | |
|---|---|---|---|
| 4,670,853 | 6/1987 | Stepien | 364/705.01 |
| 4,674,041 | 6/1987 | Lemon et al. | 705/14 |
| 4,780,599 | 10/1988 | Baus | 235/383 |
| 4,882,675 | 11/1989 | Nichtberger et al. | 705/14 |
| 4,896,791 | 1/1990 | Smith | 221/7 |
| 4,949,256 | 8/1990 | Humble | 705/14 |
| 4,973,952 | 11/1990 | Malec et al. | 364/400 |
| 5,047,614 | 9/1991 | Bianco | 235/385 |
| 5,185,695 | 2/1993 | Pruchnicki | 705/14 |
| 5,192,854 | 3/1993 | Counts | 235/375 |
| 5,287,181 | 2/1994 | Holman | 348/473 |
| 5,305,197 | 4/1994 | Axler et al. | 705/14 |
| 5,380,991 | 1/1995 | Valencia et al. | 235/385 |
| 5,420,606 | 5/1995 | Begum et al. | 345/156 |
| 5,502,636 | 3/1996 | Clarke | 705/10 |
| 5,557,721 | 9/1996 | Fite et al. | 705/14 |
| 5,594,493 | 1/1997 | Nemirofsky | 348/13 |
| 5,708,782 | 1/1998 | Larson et al. | 705/14 |

OTHER PUBLICATIONS

P. Masterson, "Targeted Discounts Scrap Paper Coupons," Jun. 13, 1994, Advertising Age, p. 40.
C. O'Leary, "Kroger to Test Electronic Displays", Supermarket News, Sep. 5, 1994, v44, n36, p. 14(1).
ISO7816–2: 1988(E), Identification cards—Integrated circuit(s) cards with contact—Part 2, International Organization for Standardization (ISO).
ISO/IEC 7816–3: 1989 (E), Identification cards—Integrated circuit(s) cards with contacts—Part 3: International Organization for Standardization (ISO).
ISO/IEC 7816–3: 1989/Amd.1: 1992 (E), Part 3: Amendment 1: Protocol type T=1, asynchronous half duplex block transmission protocol., International Organization for Standardization (ISO).

*Primary Examiner*—Edward R. Cosimano
*Attorney, Agent, or Firm*—Jerome D. Jackson

[57] ABSTRACT

A system for displaying, and redeeming electronic discount coupons in a store. The system includes a "smart card", product stations adjacent to selected products in the store, a display kiosk, and a checkout station in the checkout area. The customer may comes to the store with the card loaded with electronic coupons. At any time, the customer may insert the card in a display kiosk to view the coupons stored on the card. The display kiosk both displays a video image for each coupon on the card or prints a shopping list for items in the store corresponding to coupons on the card. Upon completion of shopping, the customer redeems the electronic coupons at the checkout area, by inserting the card into the checkout station. During checkout, when UPC data matches coupons stored on the card, the customer is credited with the value of the corresponding coupon.

38 Claims, 34 Drawing Sheets

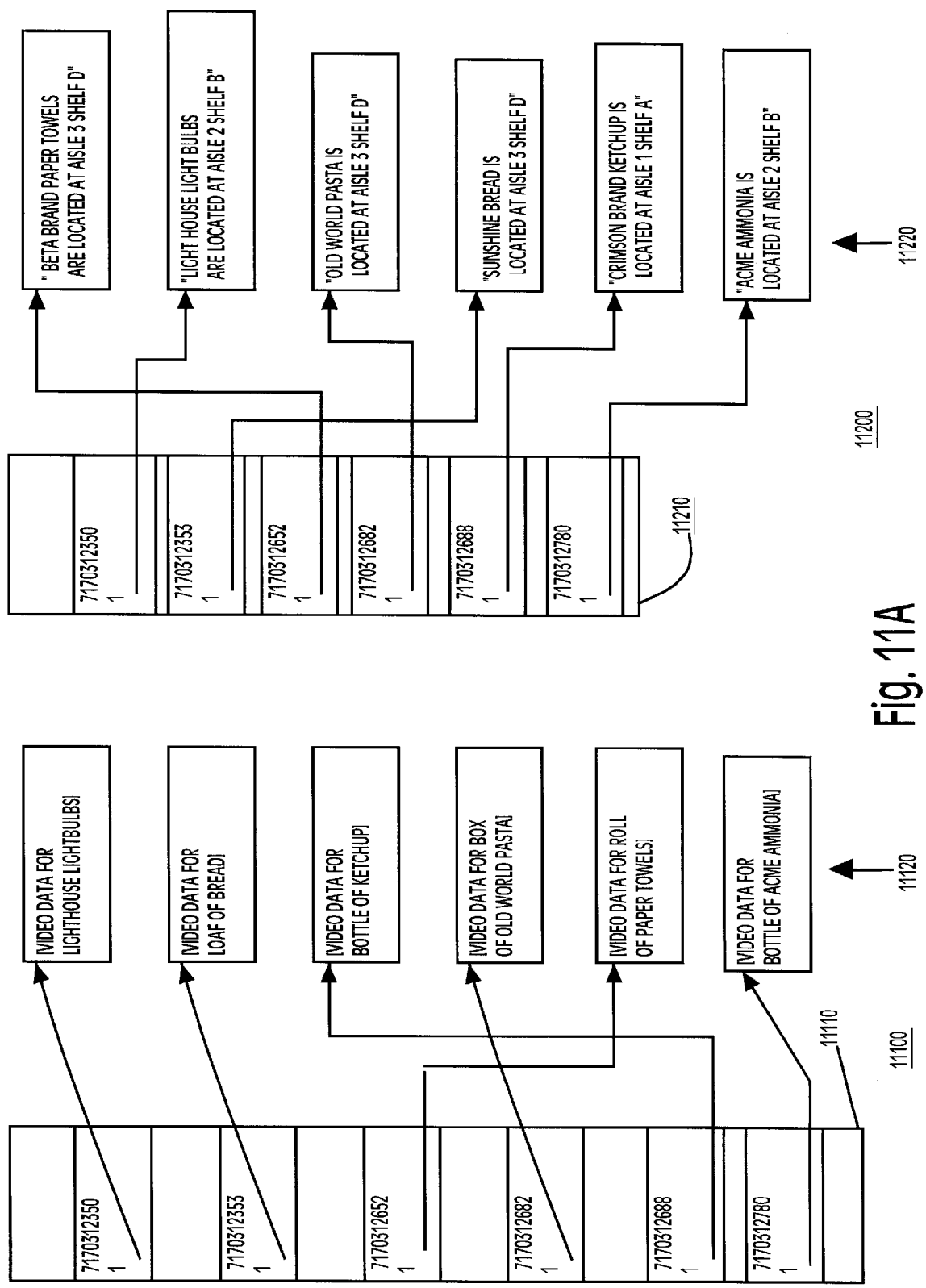

SHOPPING LIST AND STORE DIRECTORY
FOR CONTENTS OF CUSTUMER CARD:

ACME AMMONIA IS LOCATED AT
AISLE 2, SHELF B

OLD WORLD PASTA IS LOCATED AT
AISLE 2, SHELF B

LIGHTHOUSE LIGHTBULBS ARE LOCATED AT
AISLE 2, SHELF B

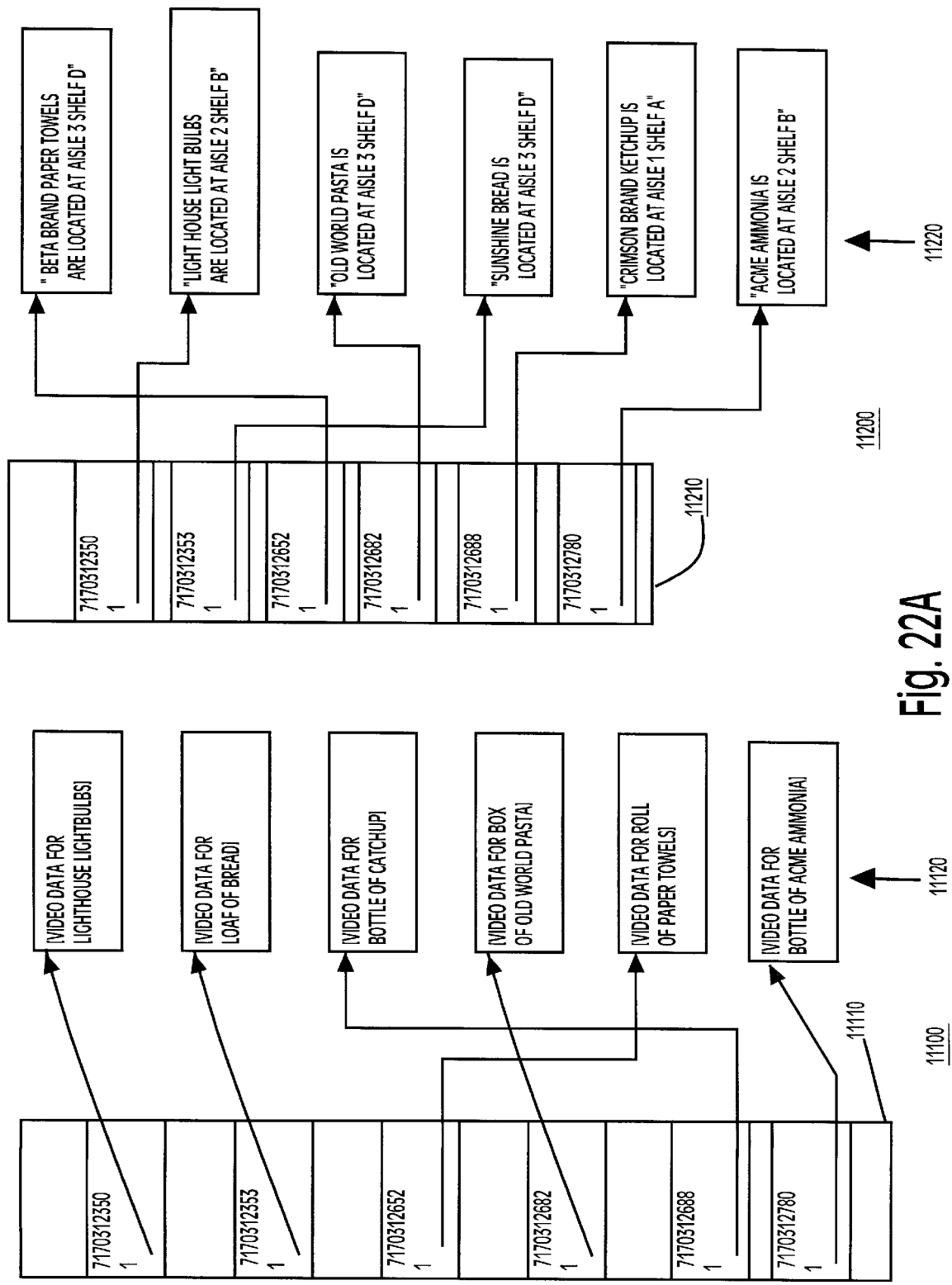

| 7170312350 |
| 1 |
| 200 |
| 950 |

| 7170312353 |
| 1 |
| 200 |
| 640 |

| 7170312652 |
| 1 |
| 125 |
| 800 |

| 7170312682 |
| 1 |
| 400 |
| 950 |

| 7170312688 |
| 1 |
| 200 |
| 400 |

| 7170312780 |
| 1 |
| 200 |
| 200 |

SYSTEM AND METHOD FOR DISPLAYING PRODUCT INFORMATION IN A RETAIL SYSTEM

BACKGROUND OF THE INVENTION

1. Field of the Invention

This invention relates generally to a retail system and, more particularly, to a system and method for displaying product information in a retail system.

2. Description of Related Art

Discount coupons are a popular means to stimulate sales of products such as grocery store items. In 1992, approximately 310 billion coupons were distributed and 7.7 billion coupons were redeemed, saving customers $4 billion. It has been estimated that in-store couponing coupled with advertising increases sales by 544%.

A typical marketing scheme involves placing coupons in a newspaper, by printing the coupons in the newspaper or by inserting coupon inserts into the newspaper, and allowing customers to bring the printed coupons to a store for redemption. One problem with this scheme is that the redemption rate is typically only a few percent of the coupons printed, the unredeemed coupons representing an overhead associated with this scheme. To alleviate this overhead, another marketing scheme involves distributing the coupons in the store, thereby avoiding the cost of printing coupons in a newspaper, and capitalizing on the fact that 66% of buyer decisions are made at the time of product purchase. Both the in-store scheme and the newspaper scheme, however, are susceptible to fraud by an unscrupulous retailer that requests reimbursement payments by presenting unredeemed coupons to the clearing house. Other schemes include delivering coupons to customers through the mail, distributing coupons in or on the product package, and distributing coupons at checkout. All of these schemes have an overhead cost of handling the coupons and of sending the redeemed coupons to a clearing house to enable product manufacturers to reimburse retailers for the reduction in proceeds resulting from coupon redemptions.

SUMMARY OF THE INVENTION

It is an object of the present invention to provide a convenient and stimulating shopping environment that allows the customer to acquire discount coupons and to track relationships between the acquired coupons and available products.

It is another object of the present invention to display an image of the products corresponding to the acquired coupons.

To achieve these and other objects of the present invention, in a system including a communication device and a plurality of portable cards each having a memory, a method of operating the system comprises the steps of reading a first signal from the memory of a card in the plurality of cards, in response to a person presenting the card at the communication device, the first signal corresponding to a product; generating, responsive to the first signal, a second signal containing an image of the product; and displaying the second signal.

According to another aspect of the present invention, a retail system comprises a plurality of portable cards each having a card memory; a communication device; first memory for storing a signal containing an image of a product; a reader that reads a first signal from the card memory of a card in the plurality of cards, in response to a person presenting the card at the communication device, the first signal corresponding to a product; a generator for accessing the first memory, using the first signal, to generate a second signal; and a display for displaying the second signal.

According to yet another aspect of the present invention, in a system including a plurality of product areas, a plurality of portable cards each having a memory, a first communication device, and a checkout area having a second communication device, a method of operating the system comprises the steps of reading a first signal from the memory of a card in the plurality of cards, in response to a person presenting the card at the first communication device, the first signal corresponding to a product in one of the product areas; displaying, responsive to the first signal, an image of the product; removing the product from one of the product areas; and reading the first signal from the memory of the card, in response to a person presenting the card at the second communication device.

According to yet another aspect of the present invention, in a system including a plurality of portable cards each having a memory, a first communication device, and a checkout area having a second communication device, a method of operating the system comprising the steps of a first reading step of reading a first signal from the memory of a card in the plurality of cards, in response to a person presenting the card at the communication device, the first signal corresponding to a product; generating, responsive to the first signal, a second signal containing an image of the product; displaying the second signal; a second reading step of reading the first signal from the memory of the card, in response to a person presenting the card at the second communication device; receiving a third signal corresponding to a product; and determining a price for the product depending on whether the first signal, read in the second reading step, corresponds to the third signal.

BRIEF DESCRIPTION OF THE DRAWINGS

FIG. 9 is a diagram of some memory contents of one of the customer card.

FIGS. 11A and 11B are diagrams of some data structures in the first preferred display kiosk.

FIG. 17 is a diagram of a paper printout generated by the display kiosk.

FIGS. 22A, 22B, and 22C are diagrams of some data structures in the second preferred display kiosk shown in FIG. 21.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

Figure 1:
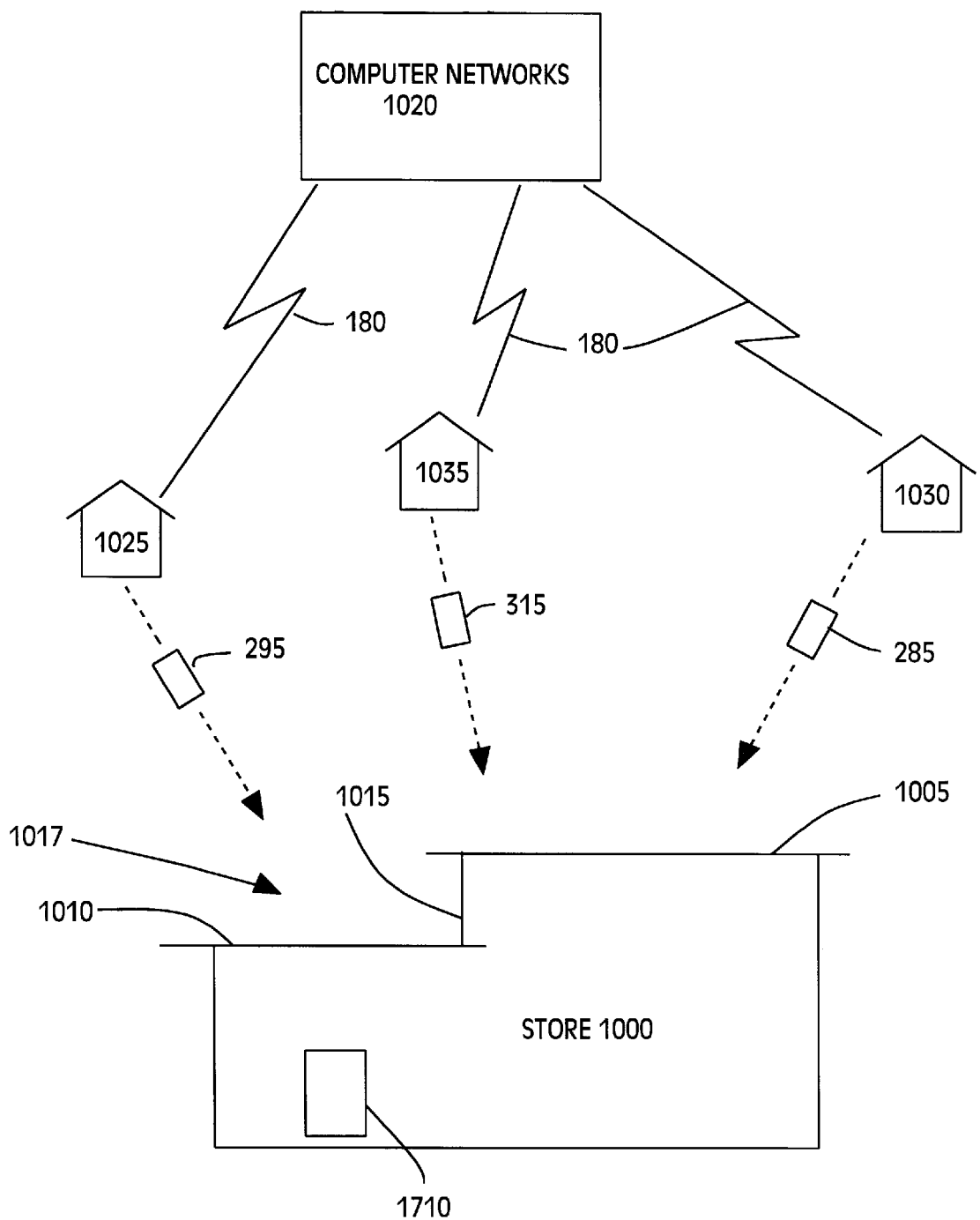
FIG. 1 is a schematic diagram of a retail system in accordance with a first preferred embodiment of the present invention.

FIG. 1 shows a system of distributing discount coupons to retail customers in accordance with a first preferred embodiment of the present invention. The first preferred system includes computer networks 1020, residential homes 1025, 1035, and 1030, portable cards 295, 315, 285, and store 1000. A coupon-dispensing computer within computer networks 1020 stores electronic coupons and distributes the stored coupons to the homes via telephone signal paths 180. A computer and special processor in each of homes 1025, 1030, and 1035 has hardware and software for receiving a coupon from computer networks 1020 and storing the coupon on each of portable cards 295, 315, and 285, respectively. Customers then bring cards 295, 315, and 285 to store 1000, as shown schematically in FIG. 1.

Store 1000 includes roof structure 1017 and display kiosk 1710 under roof structure 1017. Roof structure 1017 includes roof section 1010, window 1015 coupled to roof section 1010, and roof section 1005 coupled to window 1015. Display kiosk 1710 includes circuitry (hardware and software) for reading product identification data from a portable card and displaying information about the product identified by the data, including an image of the product and a spacial location of the product, as discussed in more detail below.

Figure 2:
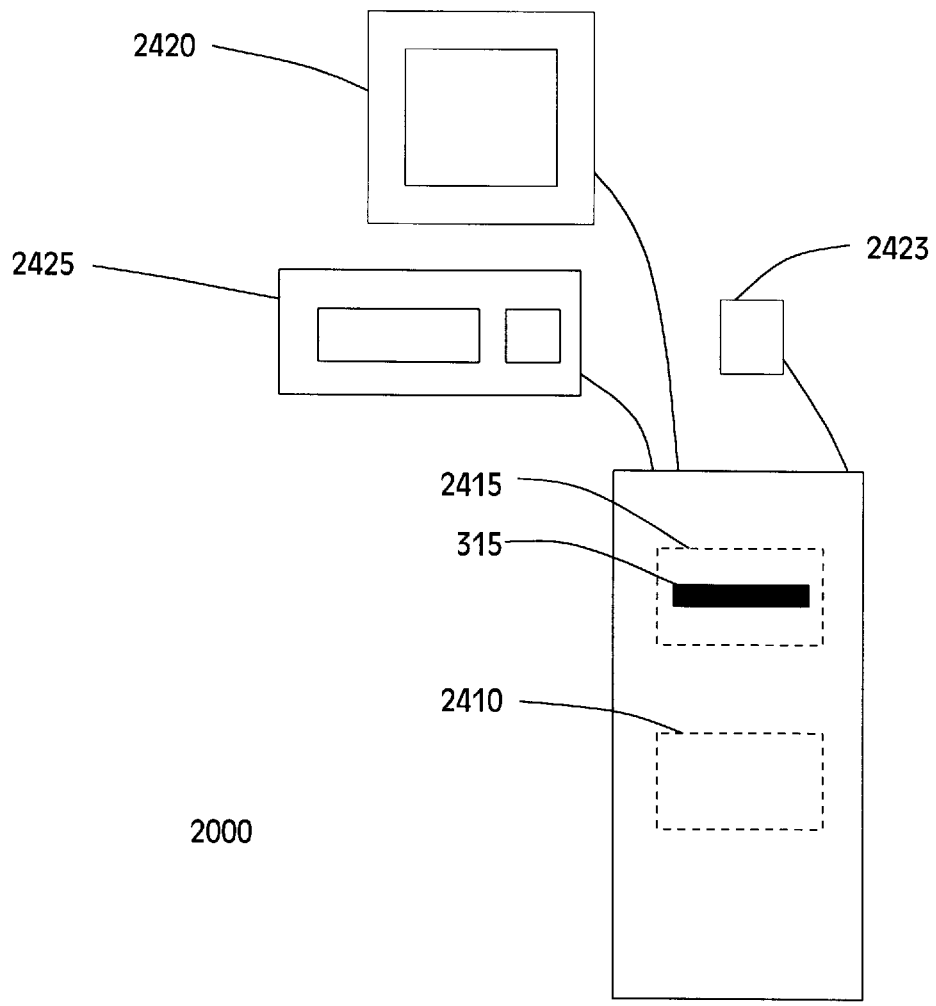
FIG. 2 is a drawing of a home computer in the first preferred retail system.

FIG. 2 shows a part of home 1035 in more detail. Home 1035 includes personal computer 2000 having keyboard 2425, cathode ray tube (CRT) 2420, and mouse 2423. To receive an electronic coupon, the user establishes a telephone connection between computer 2000 and a computer within network 1020 through modem 2410. Subsequently, the user logs onto the computer within network 1020 and reads Electronic mail sent by the coupon-dispensing computer. The customer then prints the mail message to loading device 2415. Device 2415 receives a customer card 315. A device driver program, executed by PC 2000, and device 2415 act to translate the textual electronic mail message into a binary electronic coupon and write the coupon onto card 315. In other words, device 2415 writes a product identification signal, corresponding to a selected product, onto the customer card 315.

An invention embodied in this process of sending discount coupons to a customer card is the subject of copending U.S. application Ser. No. 08/603,482 of KEN R. POWELL for SYSTEM AND METHOD FOR DISTRIBUTING COUPONS THROUGH A SYSTEM OF COMPUTER NETWORKS, filed Feb. 20, 1996, the contents of which is herein incorporated by reference.

Figure 3:
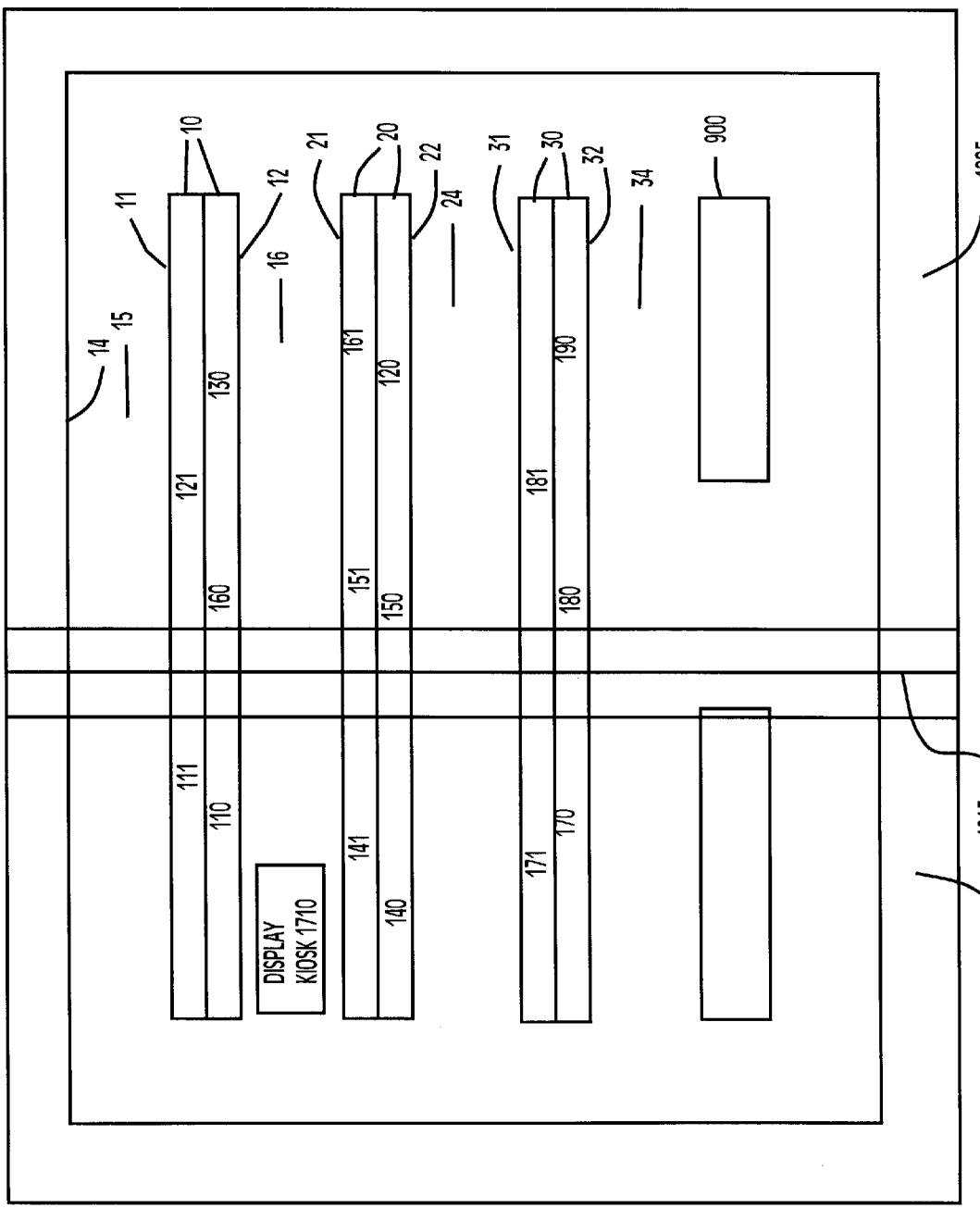
FIG. 3 is a plan view of a retail store in the first preferred system.

FIG. 3 is a plan view of store 1000, including shelves 11, 12, 21, 22, 31, and 32 and product areas 111, 121, 110, 120, 130, 141, 151, 161, 140, 150, 160, 171, 181, 170, 180, and 190. Customers shop in store 1000, by removing products from the shelves and bringing the products to checkout counter 900. When a customer visits store 1000, a customer can insert their customer card to display kiosk 1710 to view information about information about the products identified on the card, including the appearance and location of the product.

In FIG. 3, shelf assembly 10 includes shelf 11, which is designated as "SHELF A" by a poster within store 1000, and shelf 12, designated "SHELF B" by a poster within store 1000. Shelf assembly 20 includes shelf 21, designated "SHELF C" by a poster with store 1000, and shelf 22, designated "SHELF D" by a poster within store 1000. Shelf assembly 30 includes shelf 31, designated "SHELF E" by a poster within store 1000, and shelf 32, designated "SHELF F" by a poster within store 1000.

Shelf assembly 10 and wall 14 define an aisle 15. Aisle 15 is designated "AISLE 1" by a poster within store 1000. Shelf assembly 10 and shelf assembly 20 define aisle 16. Aisle 16 is designated "AISLE 2" by a poster within store 1000. Shelf assembly 20 and shelf assembly 30 define an aisle 24. Aisle 24 is designated "AISLE 3" by a poster within store 1000. Shelf assembly 30 and checkout counter 900 define an aisle 34. Aisle 34 is designated "AISLE 4" by a poster within store 1000.

Figure 4A:
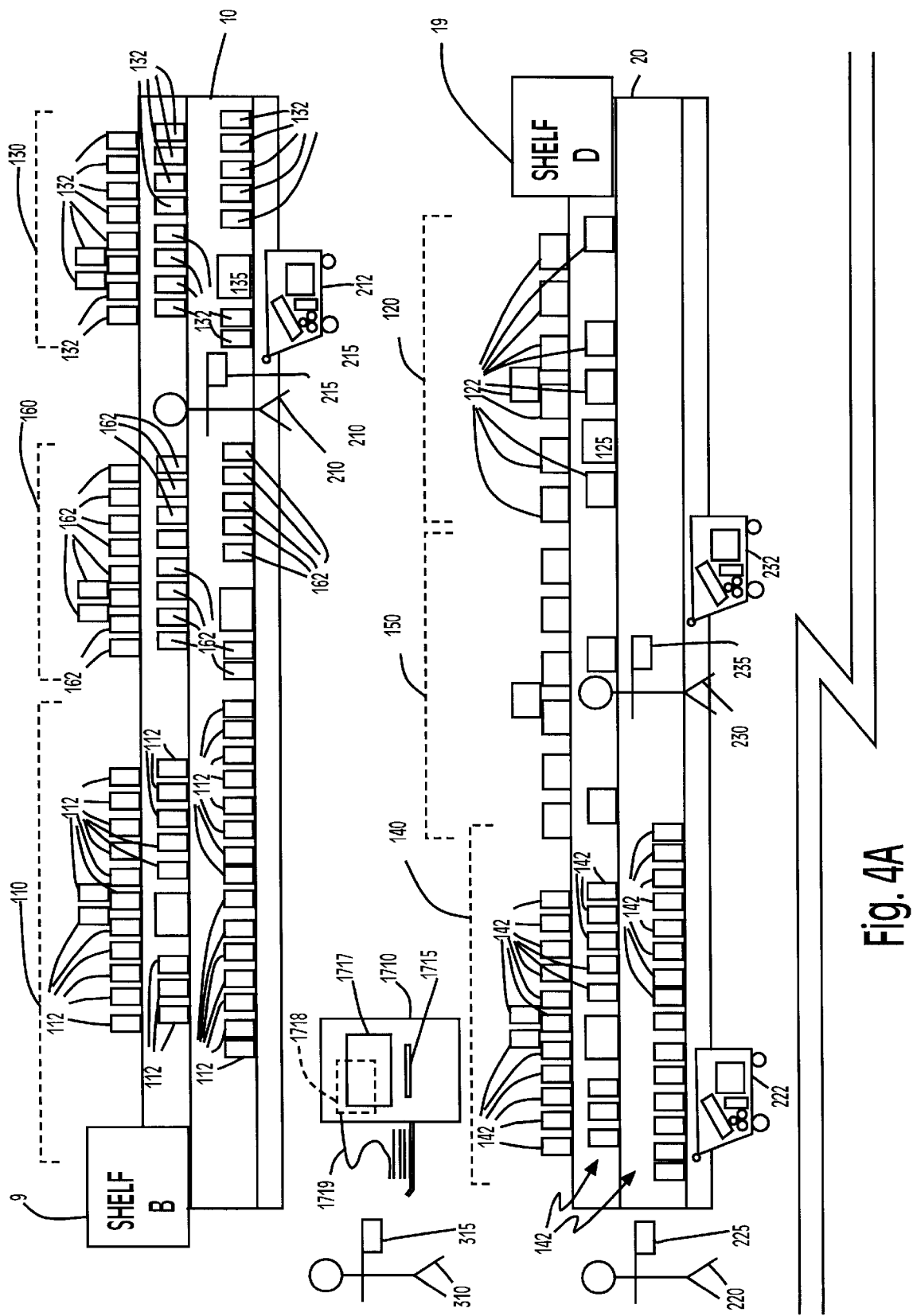
FIGS. 4A and 4B are another type of view of the retail store.
Figure 4B:
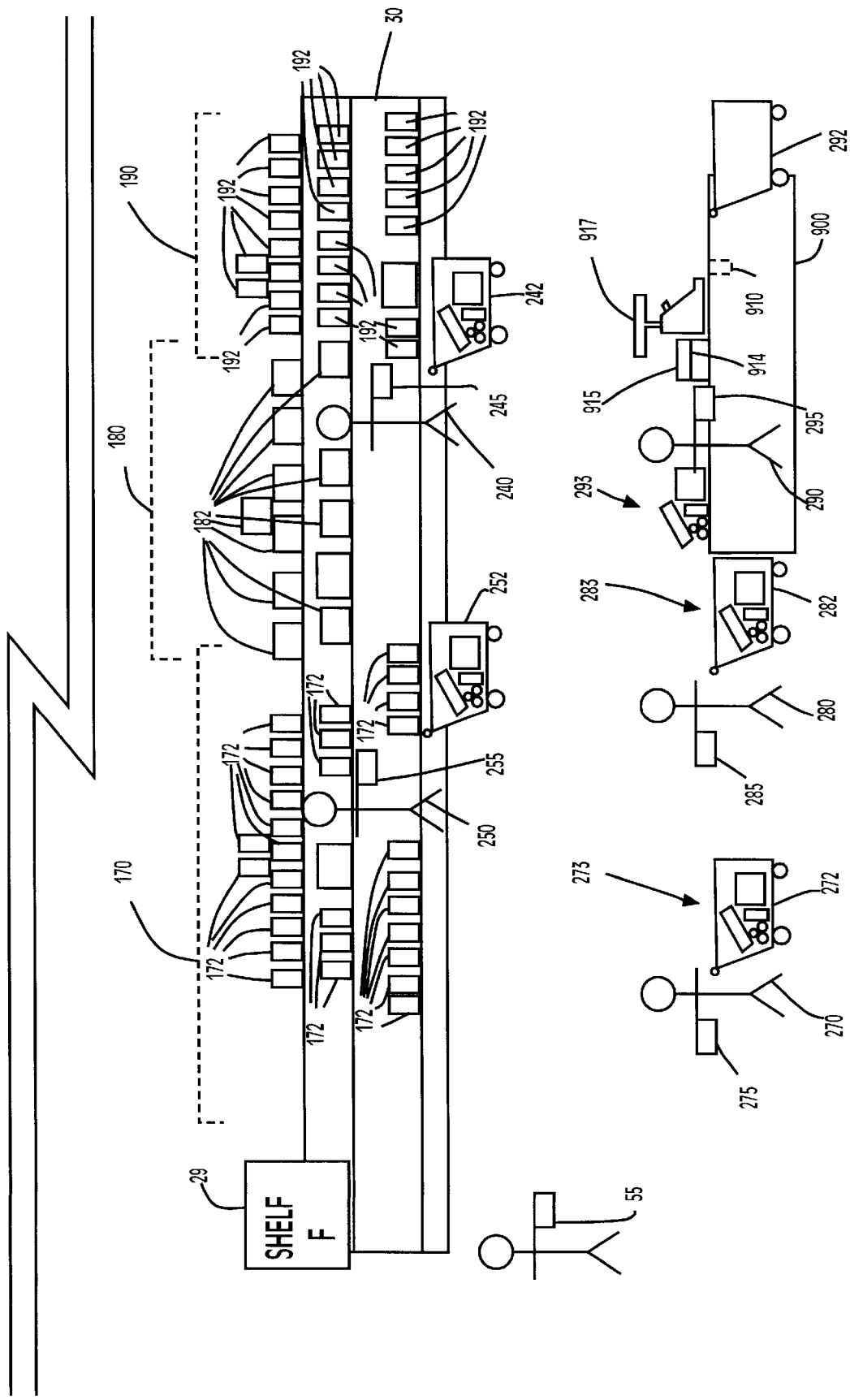

FIGS. 4A and 4B show another view of store 1000 in accordance with a first preferred embodiment of the present invention. FIGS. 4A and FIG. 4B are each a partial view of store 1000. Customers 210, 220, 230, 240, 250, 270, 280, and 290, shop in store 1000.

Store 1000 includes shelve assemblies 10, 20, and 30, defining aisles between the shelves. Store 1000 has a plurality of product areas, each corresponding to a respective product. Product Area 110 has Acme brand ammonia. Product Area 120 has Old World brand pasta. Product Area 130 has Lighthouse brand light bulbs.

In FIGS. 4A and 4B, poster 9 contains the text SHELF B, allowing the customers to identify the shelf containing product areas 110, 160, and 130 as shelf B. Poster 19 contains the text SHELF D, allowing the customers to identify the shelf containing the product areas 140, 150, and 120 as shelf D. Poster 29 contains the text SHELF F, allowing the customers to identify the shelf containing product areas 170, 180, and 190 as shelf F. Similarly, other posters (not shown) identify other shelves and aisles within store 1000.

Because of the large number of coupons that may be available to a customer, from either in the store or outside the store, a customer such as customer 310 may wish to present their card 315 to display kiosk 1710. Kiosk 1710 has circuitry for displaying information about the coupons loaded onto the card, including the product and discount amount of the coupon. Kiosk 1710 also has circuitry for displaying information about the products corresponding to the coupons loaded onto the card, including a verbal description of the product, an image of the product, and a spacial location of the product. Kiosk 1710 has circuitry to display information on paper 1719, using printer 1718, or on cathode ray tube (CRT) 1717.

Figure 5:
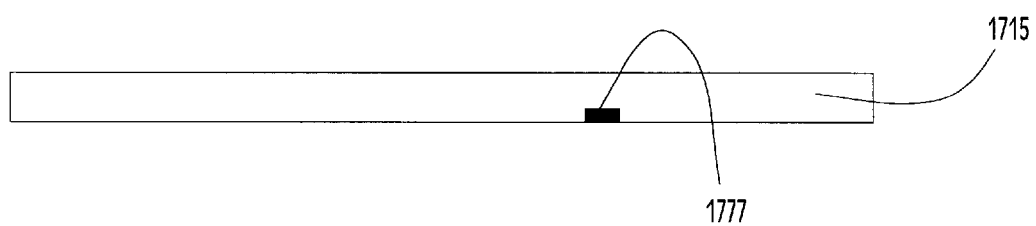
FIG. 5 is a drawing of portion of the display kiosk shown in FIG. 4A.

FIG. 5 shows a section of display kiosk 1710 in more detail. Interface slot 1715 has a width sufficient to accommodate the width of one of the customer cards. When a customer card is in interface slot 1715, conductive contact 1777 inside interface slot 1715 touches contact 7427 (shown in FIG. 7C) on a customer card. Interface slot 1715 has other contacts (not shown) for touching the other card contacts 7420 (shown in FIG. 7C). The operation of station 1710 will be discussed in more detail below.

Figure 6A:
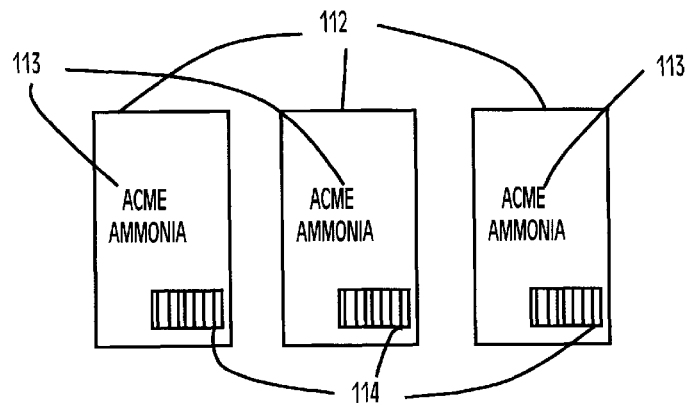
FIGS. 6A, 6B, and 6C are enlarged views of some products shown in FIGS. 4A and 4B.

FIG. 6A shows an enlarged view of some of the bottles of ammonia 112. Each bottle of ammonia has a common Universal Product Code (UPC) label 114, which is a group of parallel lines that encodes a number (7170312780) that uniquely identifies acme ammonia. In other words, label 114 is different than labels of units of other products. Each bottle of ammonia 112 also has a common character label 113 that verbally describes the product. Character label 113 is "ACME AMMONIA." Label 113 is different than labels of units of other products.

Product Area 120 has boxes of pasta 122 grouped together on multiple shelves. Boxes of pasta 120 are contiguously grouped, meaning that no other product is between any two boxes of pasta 120. No other product is between product station 125 and boxes of pasta 122. Product Station 125 is on a shelf under some of the boxes 122. In other words, station 125 is adjacent to boxes 122 and supported by a shelf in vertical alignment with some of the boxes 122.

Figure 6B:
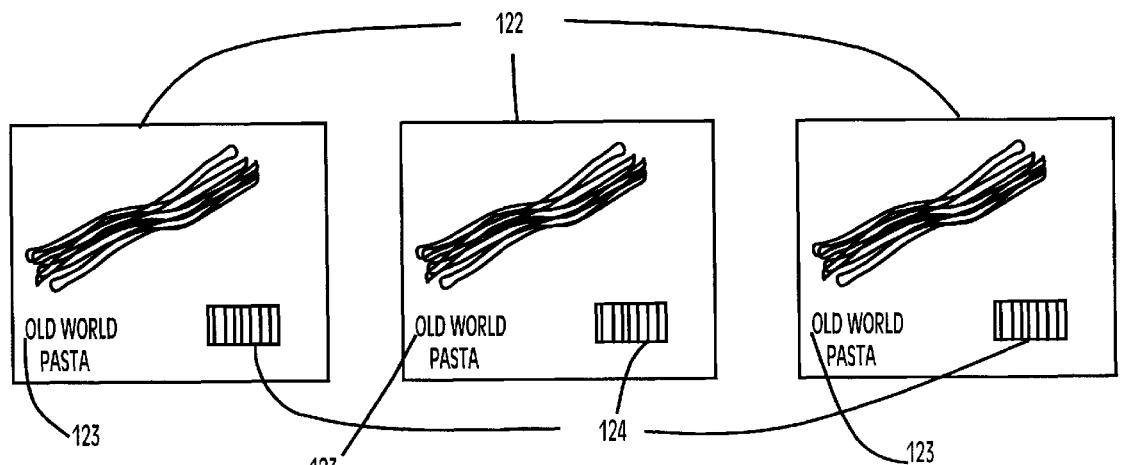

FIG. 6B shows an enlarged view of some of the boxes of pasta 122. Each box of pasta 122 has a common Universal Product Code (UPC) label 124, which is a group of parallel lines that encodes a number (7170312682) that uniquely identifies Old World pasta. In other words, label 124 is different than labels of units of other products. Each box of pasta 122 also has a common character label 123 that verbally describes the product. Character label 123 is "OLD WORLD PASTA." Label 123 is different than labels of units of other products.

Product Area 130 has boxes of light bulbs 132 grouped together on multiple shelves. Boxes of light bulbs 132 are contiguously grouped, meaning that no other product is between two boxes of light bulbs 132. No other product is between product station 135 and boxes of light bulbs 132. Product Station 135 is on a shelf under some of the boxes 132. In other words, station 135 is adjacent to boxes 132 and supported by a shelf in vertical alignment with some of the boxes 132.

Figure 6C:
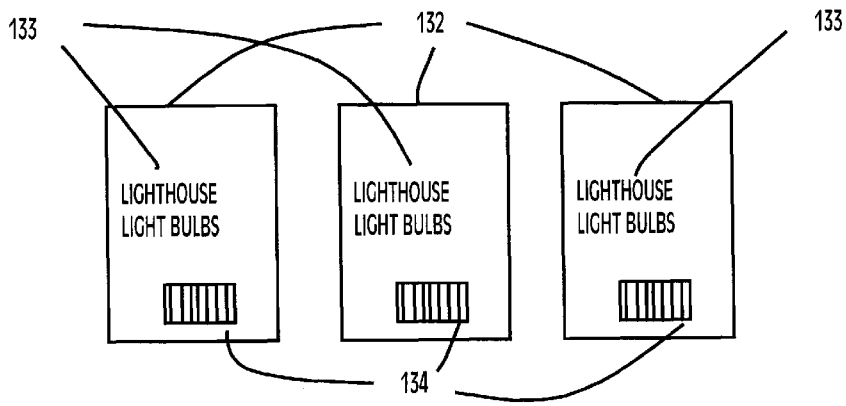

FIG. 6C shows an enlarged view of some of the boxes of light bulbs 132. Each box of light bulbs 132 has a common Universal Product Code (UPC) label 134, which is a group of parallel lines that encodes a number (7170312350) that uniquely identifies Lighthouse light bulbs. In other words, label 134 is different than labels of other products. Each box 132 also has a common character label 133 that verbally describes the product. Character label 133 is "LIGHTHOUSE LIGHT BULBS." Label 133 is different than labels of other products.

Similarly, other product area in the store each have a set of respective products contiguously grouped together. The respective units of a certain product have a common label, different than labels on units of other products, that uniquely identifies the certain product. Product area 140 has bottles of ketchup 142 contiguously grouped together. Product area 160 has loaves of bread 162 contiguously grouped together. Product area 170 has cartons of milk 172 contiguously grouped together. Product area 180 has packages of bacon 182. Product area of 190 has packages of butter 192 contiguously grouped together. Product area 111 (FIG. 3) has boxes of paper towels contiguously grouped together. Product area 121 has rolls of paper towel contiguously grouped together. Product area 141 has boxes of crackers contiguously grouped together. Product area 151 has canned fruit contiguously grouped together. Product area 161 has canned vegetables contiguously grouped together. Product area 171 has cans of meat contiguously grouped together. Product area 181 has boxes of flour contiguously grouped together.

An overview of processing performed by the customers and hardware will now be described. Before shopping in the store, each of these customers obtained a customer card. For example, customer 230 obtained customer card 235 from a bank, by completing an application for the bank. The application contained questions to collect demographic data, including birth date, income level, past buying patterns, geographic location, size of family, level of education, and job-related data. The bank subsequently wrote customer identification data for customer 230 onto customer card 235, and issued customer card 235 to customer 230, and sent the customer's demographic data to a marketing research center which then stored the demographic data on disk. Each of customers 210, 220, 240, 250, 270, 280, and 290 obtains a respective customer card in a similar manner. In other words, for each customer the preferred method writes demographic data for the customer onto a disk in market research center, and writes personal identification data for the customer onto a respective card for the customer.

After redemption data, including customer identification data from a plurality of cards, is compiled and sent to a marketing research center, as described below, the customer identification data is used to access the corresponding demographic data, thereby providing the manufacturer with valuable marketing data on coupon program effectiveness and customer demographics.

A customer may start shopping with a card already loaded with electronic coupons. For example, the store may preload new cards as an incentive for completing and submitting a check cashing application. Further, the customer may have a device at home, such as computer 2000 shown in FIG. 2, for depositing coupons onto the card. Thus, a customer may arrive at store 1000 with coupons already on the card.

While shopping in store 1000, each of customers 210, 220, 230, 240, 250, 270, 280, and 290 carries his or her respective customer card. Customer 210 carries card 215, customer 220 carries card 225, customer 230 carries card 235, customer 240 carries card 245, customer 250 carries card 255, customer 270 carries card 275, customer 280 carries card 285, and customer 290 carries card 295. Each customer tows a shopping cart to hold selected products. Customer 210 tows cart 212, customer 220 tows cart 222, customer 230 tow cart 232, customer 240 tows cart 242, customer 250 tows cart 252, customer 270 tows cart 272, customer 280 tows cart 282, and customer 290 tows care 292. Each customer removes one or more desired products from a shelf and places the removed product into her cart.

Upon completion of shopping, the customer brings selected products from shelves 10, 20, and 30 to checkout counter 900. The customer redeems the electronic coupons at the checkout area, by inserting her customer card into checkout station 915. For example, a customer such as customer 290 in FIG. 4B completes the purchase of her selected products 293 by transferring products 293 from her cart 292 to counter 900, and by inserting card 295 into checkout station 915. Subsequently, a checkout clerk (not shown) scans each selected product past UPC bar code reader 910. Bar code reader 910 is an optical detector. In other words, bar code reader 910 detects an electromagnetic signal. A processor coupled to station 915 and reader 910 determines whether the most recently scanned product is on a discount list stored in card 295. If the most recently scanned product is identified in this discount list, a price for the product is determined using the discount data corresponding to the product, and the resulting price is displayed on display 917. Checkout counter 900 scans and processes each product 293 in a similar manner.

Similarly customer 280 in FIG. 4B will complete the purchase of her selected products 283 by transferring products 283 from her cart 282 to counter 900, and by inserting card 285 into checkout station 915; and the checkout clerk (not shown) will scan each selected product 283 past UPC bar code reader 910. Customer 270 will complete the purchase of her selected products 273 by transferring products 273 from her cart 272 to counter 900, and by inserting card 275 into checkout station 915; and the checkout clerk (not shown) will scan each selected product 273 past UPC bar code reader 910.

Periodically, checkout counter 900 sends redemption data to an electronic clearing house. The redemption data sent to the clearing house includes the identification of the store, identification of the coupons redeemed and of respective quantities of coupon redemptions. Periodically, checkout counter 900 sends redemption data to a market research center. The redemption data sent to the research center includes the identification of the store and of the customers who presented electronic coupons for redemption.

The preferred system and method will now be described in more detail.

Figure 7A:
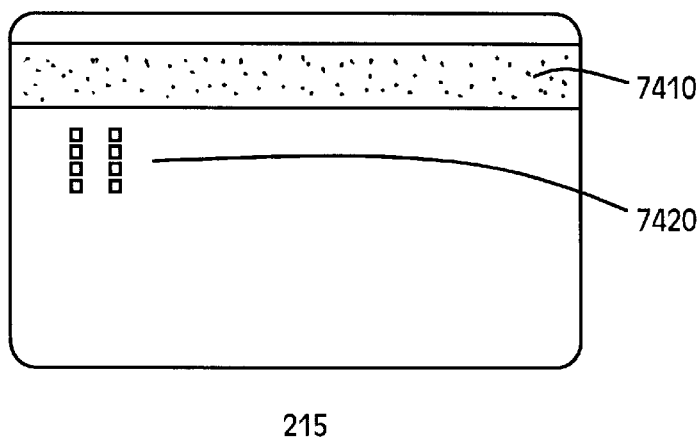
FIG. 7A is a plan view of one of the customer cards in the preferred system.
Figure 7B:
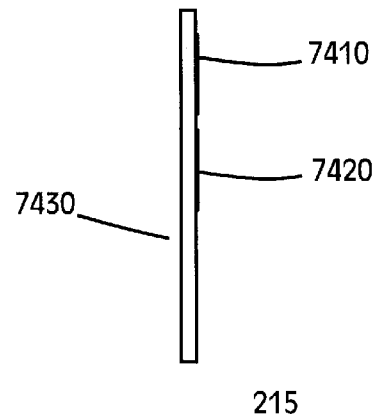
FIG. 7B is a side view of the card shown in FIG. 7A.

FIG. 7A shows a plan view of customer card 215 carried by customers 210, and FIG. 7B shows a side view of card 215. Card 215 is 8.5 cm by 5.4 cm, the length and width of a typical financial credit card. Card 215 is slightly thicker than a typical financial credit card. Card 215 includes a magnetic stripe 7410, interface contacts 7420 for communication with the product stations and the checkout station, and embossed area 7430 for displaying the card owner's name. Magnetic stripe 7410 allows a conventional credit card stripe reader to read basic data from the card. Magnetic stripe 7410 is not necessary to the operation of the preferred embodiment of the invention, described in more detail below.

Figure 7C:
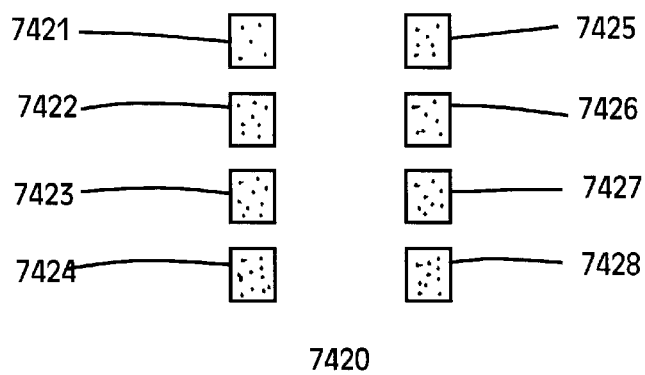
FIG. 7C is an enlarged, partial view of the card shown in FIG. 7A.

FIG. 7C shows interface contacts 7420 in more detail. Interface contacts 7420 are configured in accordance with ISO7816-2: 1988(E), Identification cards—Integrated circuit(s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 7421 is assigned to VCC (supply voltage), contact 7422 is assigned to RST (reset signal), contact 7423 is assigned to CLK (clock signal), contact 7424 is reserved for future use, contact 7425 is assigned to GND (ground), contact 7426 is assigned to VPP (program and voltage), contact 7427 is assigned to I/O (data input/output), and contact 7428 is reserved for future use. Card 215 communicates with the product stations and the checkout stations through contact 7427 using a half duplex scheme, meaning that contact 7427 is for communicating data signals either to or from the card.

Figure 8:
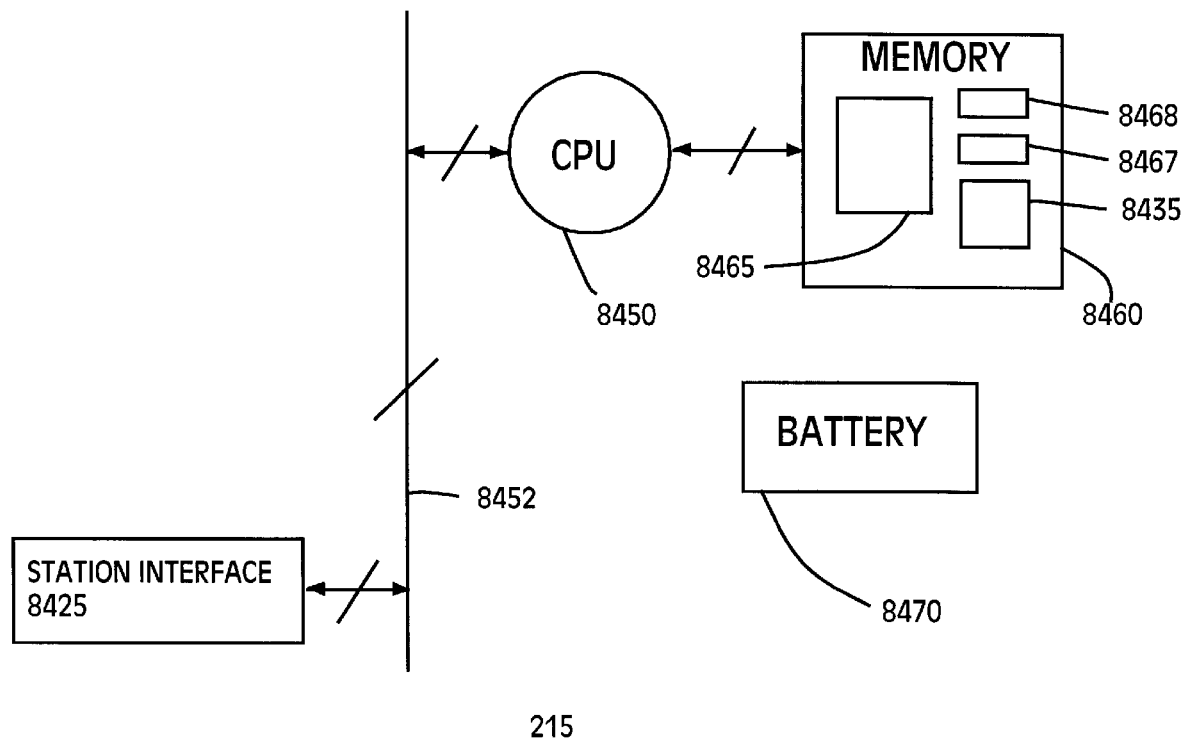
FIG. 8 is a block diagram of the customer card.

FIG. 8 is a block diagram of customer card 215, including central processing unit 8450, memory 8460, and battery 8470 for supplying power to interface 8425, processor 8450, and memory 8460. Memory 8460 is a random access, addressable device. Station interface 8425 includes a serial to parallel converter for transferring data signals between contact 8427 and CPU 8450 over parallel bus 8452. Memory 8460 stores a program 8465 executed by processor 8450, customer identification data 8467, and authorization data 8468. Customer identification data 8467 includes a sequence of digits that uniquely identifies the holder of the card. Customer identification data 8467 includes the card holder's social security number. For example, identification data 8467 in customer card 235 uniquely identifies customer 230. Authorization data 8468 includes a sequence of digits that includes a code identifying the store or stores in which the card may be used to obtain a paperless coupon. Authorization data 8468 also includes date data indicating an expiration date for the card. Depending on the card holder's contractual relationship with the card issuer, the card issuer may periodically update this date data to renew the card when the current date data indicates the card is expired. Store authorization data 8468 also contains a field identifying that the card is a customer card (rather than a programming card, which is described below).

Memory 8460 also stores product data received from one or more coupon dispensing devices. This product data includes a list of product discounts 8435. When a customer inserts a customer card into a coupon dispensing device, processor 8450 receives an identification code for the product from the device and adds the code to the list.

FIG. 9 shows some the contents list 8435 starting at location 30 of memory 8460 of customer card 215. An electronic coupon is represented by three rows in list 8435: a 10 digit UPC product code in the first row, discount format data in the second row ("1" signifying cents, "2" signifying percentage), and discount quantity data in the third row. In FIG. 9, the customer card is storing three electronic coupons, reflecting the fact that customer 210 has received electronic coupons from devices either before or during her current visit to store 1000. In list 8435, the memory field having the product code 7170312682 corresponds to the UPC code on boxes of Old World Pasta 124. The next memory field stores the format of the discount quantity data, with "1" signifying cents and "2" signifying percentage in tenths of a percent. The next memory field stores the discount quality data, 150, signifying that the discount being offered for Old World Pasta 124 is $1.50. The memory field having the product code 7170312350 corresponds to the UPC code on boxes of Lighthouse Light Bulbs 134. The next memory field stores the format of the discount quantity data, with "1" signifying cents. The next memory field stores the discount quantity data, 200, signifying that the discount being offered for Lighthouse Light Bulbs 134 is $2.00. The memory field having the product code 7170312780 corresponds to the UPC code on ammonia bottles 112. The next memory field stores the format of the discount quantity data, with "1" signifying cents. The next memory field stores the discount quantity data, 50, signifying that the discount being offered for ammonia bottles 112 is 50 cents.

Each customer cards has the same hardware structure as customer card 215.

Programming card 55 has the same hardware structure as customer card 215. An invention embodied in programming card 55 is the subject of copending application of KEN R. POWELL for DEVICE AND METHOD OF PROGRAMMING A RETAIL SYSTEM, Ser. No. 08/468,820, filed on Jun. 6, 1995, the contents of which is herein incorporated by reference. The product stations are the subject of copending application of KEN R. POWELL for RETAIL SYSTEM, Ser. No. 08/468,816, filed on Jun. 6, 1995, now U.S. Pat. No. 5,727,153 for RETAIL STORE HAVING A SYSTEM OF RECEIVING ELECTRONIC COUPON INFORMATION FROM A PORTABLE CARD AND SENDING THE RECEIVED COUPON INFORMATION TO OTHER PORTABLE CARDS, the contents of which is herein incorporated by reference.

Figure 10:
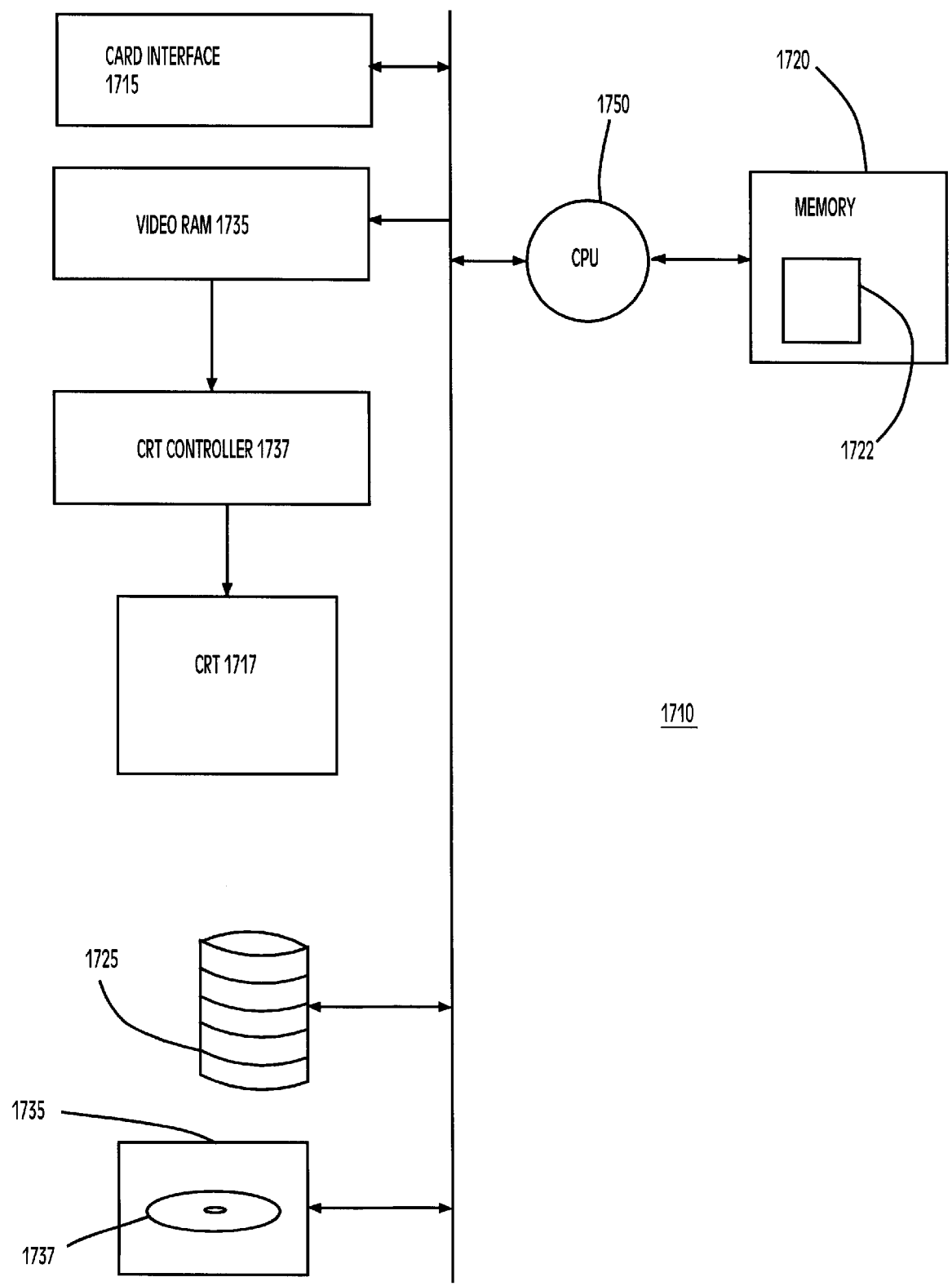
FIG. 10 is a block diagram of the first preferred display kiosk shown in FIGS. 1, 3, and 4A.

FIG. 10 is a block diagram of display kiosk 1710 shown in FIGS. 1, 3, and 4A. Magnetic disk drive 1725 provides storage of programs and of product data. The product data stored on disk 1725 includes product name data and product location data. Optical disk drive 1735 contains a CD-ROM (Compact Disk-Read Only Memory) disk that stores product image data. The contents of CD-ROM 1737 tend to remain current for at least several months, since the packaging of a product corresponding to a certain UPC code tends to remain constant over time. Preferably, CD-ROM 1737 can be obtained from a national supplier.

CRT display 1717 is 1024 pixel rows by 1280 pixel columns. Video ram 1735 has 1024×1280 locations, a location for each pixel on display 1717. CRT controller 1737 has circuitry to read video ram 1735 to generate and send signals to CRT 1717. Thus, the address of a pixel in video ram 1735 determines the location of the pixel on display 1717.

CPU 1750 executes program 1722, in random access, addressable memory 1720, to display information reflecting the contents of a customer card. CPU 1750 displays the information on CRT display 1717, by writing pixel data into video RAM 1735. CRT controller 1737 reads the pixel data from RAM 1737 to send video signals to CRT 1717.

Figure 11B:
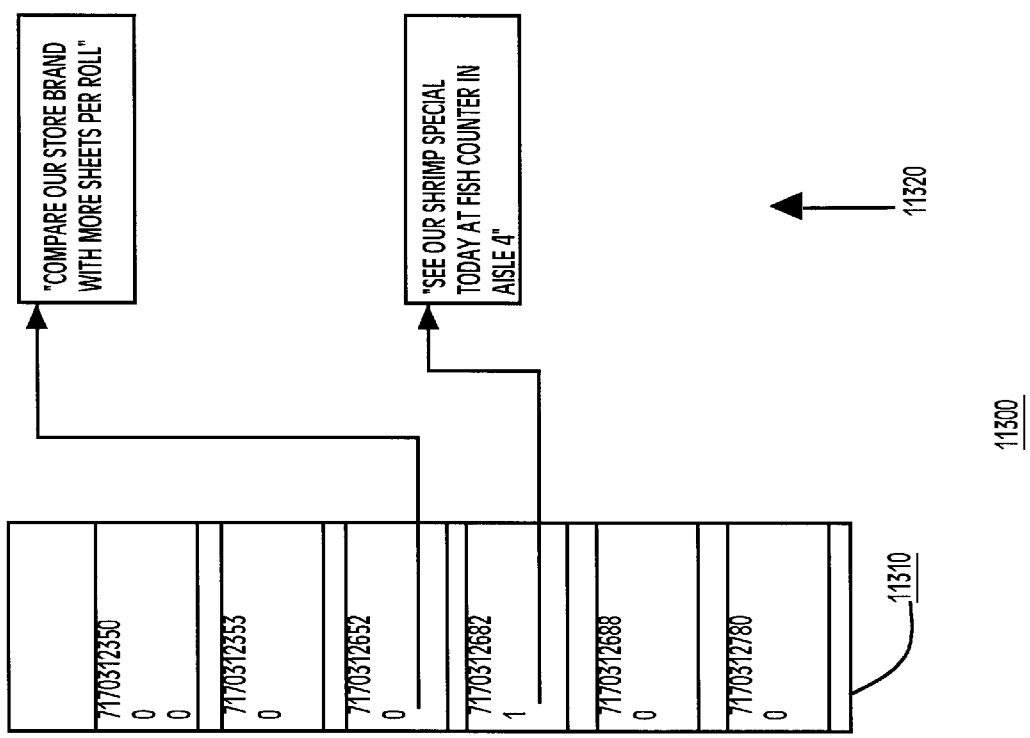

FIGS. 11A and 11B show some data structures within display kiosk 1710. Structure 11100 includes image data for displaying an image of products corresponding to coupons on a customer card. Structure 11100 normally resides on CD-ROM 1737. Structure 11100 includes UPC table 11110, which is a list of entries sorted by UPC code. Each entry in table 11110 includes three fields. A first field is a UPC code; a second field is an action code, described in more detail below; and a third field is a pointer to video data 11120 for the product identified by the UPC code. Video data 11120 is a group of records each containing pixel data for a respective product. CPU 1750 uses the pointer, in the third field of an entry in table 11100, to access a selected record of pixel data 11120.

During processing by CPU 1750, various parts of data structure 11100 may be automatically brought into memory 1720 with a virtual memory mapping, as is well known in the art.

Data structure 11200 stores product location information. In contrast to data structure 11100, data structure 11200 tends to contain product information that is specific to store 1000. Data structure 11200 normally resides on disk 1725. Data structure 11200 includes table 11210, which is a list of entries sorted by UPC code. Structure 11200 also includes spacial location data 11200, which is a group of records each containing ASCII (American Standard Code for Information Interchange) text identifying the spatial location of a respective product. Each entry in table 11210 includes a UPC code in a first field, an action code in a second field, and a pointer to a selected location data record 11220 in a third field. CPU 1750 uses the pointer to access a selected record of location information.

Thus, memory 1720, magnetic disk 1725, and optical disk drive 1735, together act to store product image and product location information.

CPU 1750 brings various parts of data structure 11200 into memory 1720, using a virtual memory mapping scheme.

Data structure 11300 includes table 11310 and supplementary product data 11320. Data structure 11300 normally resides on disk 1725. Supplementary product data contains ASCII text providing additional information about products in the store. As shown in data structure 11300, supplementary product record 11325 provides information about a product different from the product identified in the corresponding entry in table 11310.

Figure 12:
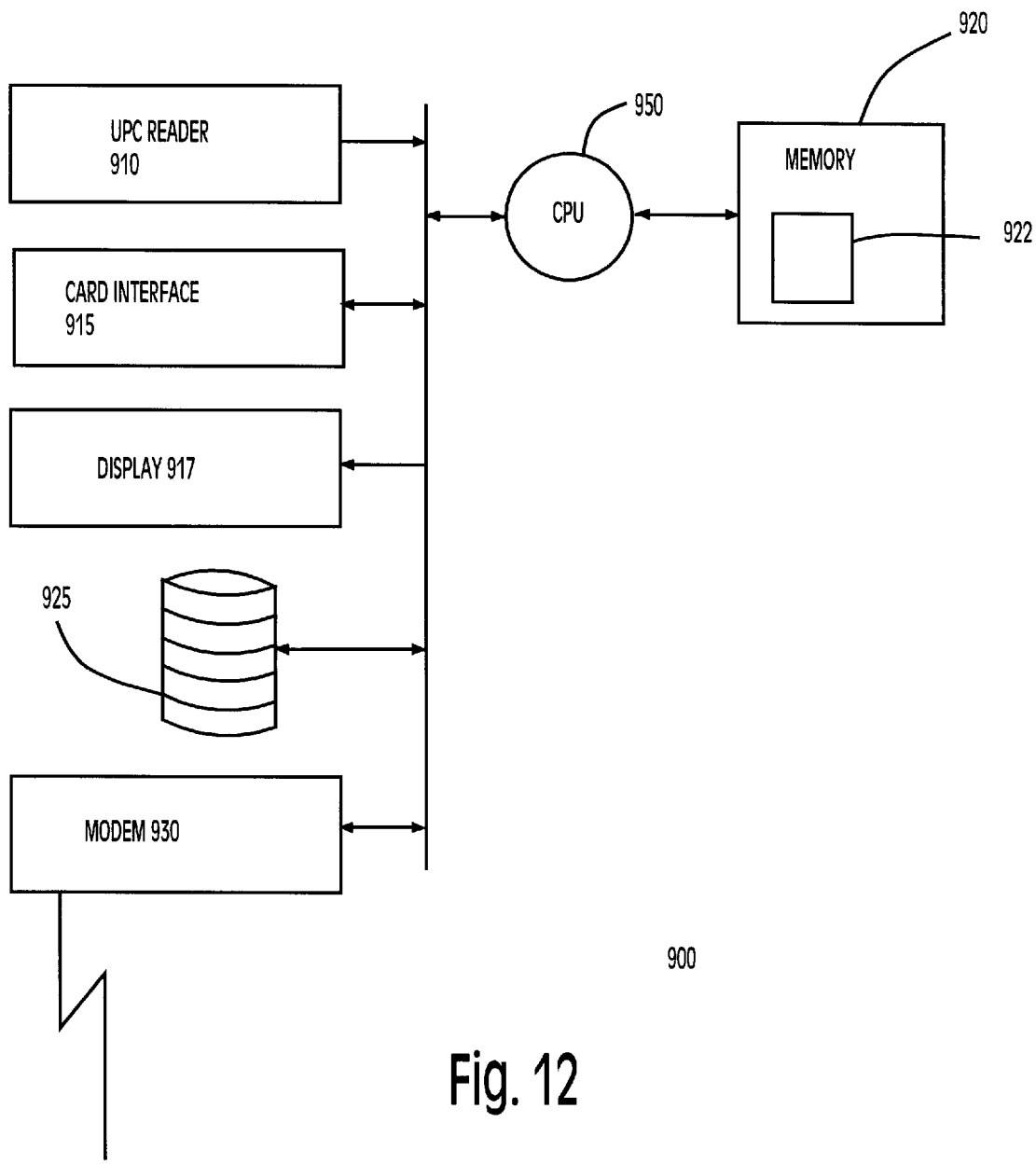
FIG. 12 is a block diagram of the check-out station shown in FIG. 4B.

FIG. 12 is a block diagram of checkout counter 900 shown in FIG. 4B. Disk 925 provides long term storage. CPU 950 executes instructions in random access, addressable memory 920.

CPU 950 and program 922 act to detect a product scanned by UPC reader 910, determine a reference price for the product, search for the product's identification in the memory of a customer card, and deduct a discount from the reference price if the product is identified in the customer card memory. CPU 950 then displays the price of the product on display 917. CPU 950 writes coupon redemption data onto disk 925. Periodically, CPU 950 sends marketing redemption data to a market research center through modem 930. Periodically, CPU 950 also sends clearing house redemption data to a clearing house through modem 930.

Figure 13:
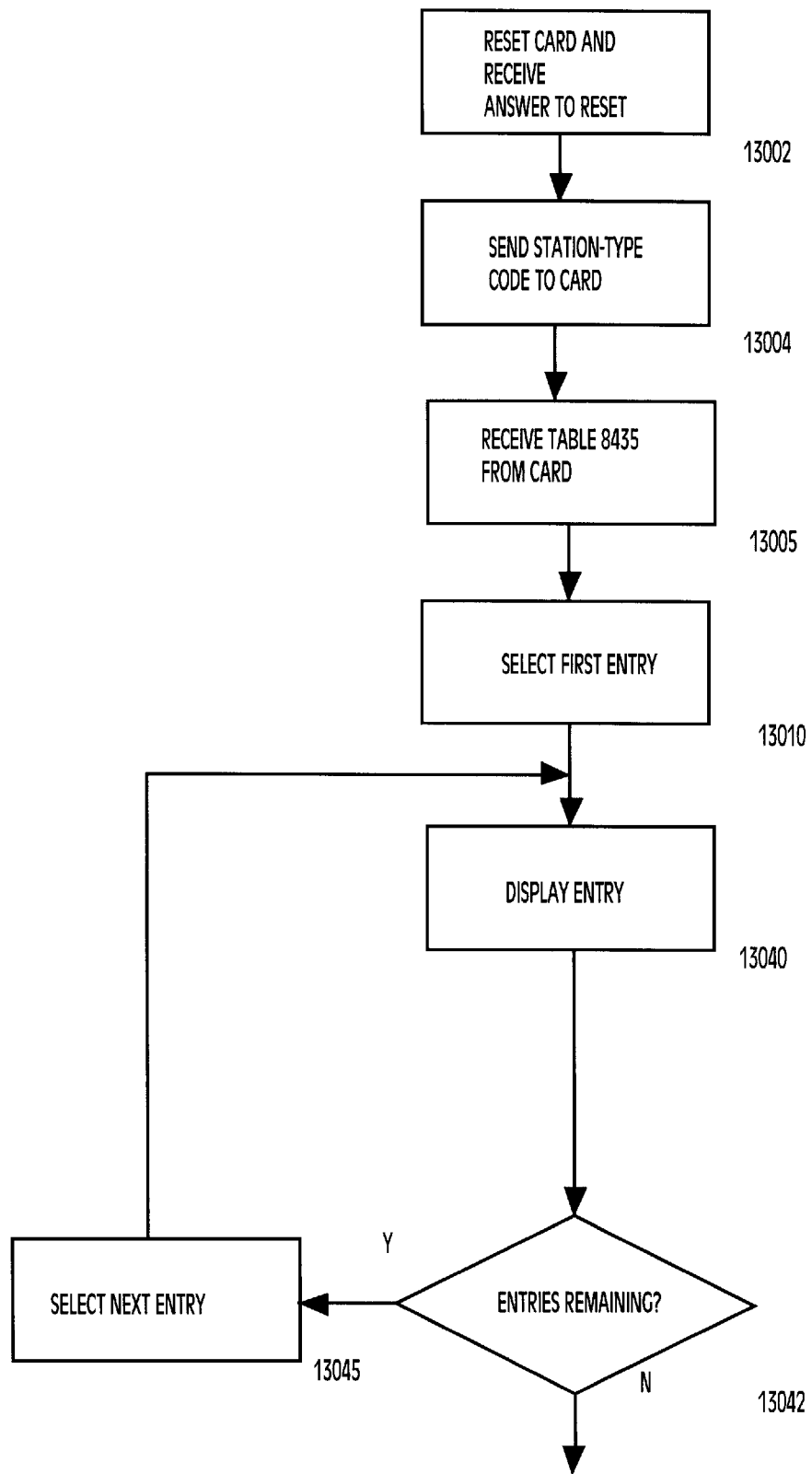
FIG. 13 is a flow chart of a processing performed by the display kiosk.

FIG. 13 shows a processing performed by CPU 1750 and program 1722 in display kiosk 1710, when a customer inserts a card into card interface 1715. When a customer, such as customer 310, inserts customer card 315 into interface slot 1715, a switch (not shown) in interface slot 1715 alerts CPU 1750 that a card has been inserted into the slot. When a customer card is in interface slot 1715, conductive contacts (not shown) inside interface slot 1715 touch each card contact 7420. Subsequently, CPU 1750 causes card interface 1725 to reset the card by applying a clock signal to card contact 7423. The customer card then answers the reset by sending a block of data, including identification data 8467 and authorization data 8468, through card contact 7427. CPU 1750 then receives the answer-to-reset from the card (step 13002). CPU 1750 then sends a data block containing a station-type code indicating a display kiosk (step 13004). CPU 1750 then receives the contents of table 8435 in memory 8460 of the customer card, and temporarily stores these table contents in memory 1720 of the display kiosk (step 13005). CPU 1750 selects the first entry in table 8435 (step 13010). CPU 1750 displays product and price information for the presently selected entry on display 1717. (Step 13040). If there are entries remaining (step 13042), CPU 1750 selects the next entry in table 8435 (step 13045) and processing proceeds to step 13040. If there are no entities remaining (step 13042), there is no further processing shown in FIG. 13.

Steps 13040, 13042, and 13045 may execute repeatedly without manual intervention. For example, step 13040 may pause for 10 seconds before control passes to the next step. Alternatively, step 13040 may pause until the user presses a button entitled DISPLAY NEXT COUPON (not shown) on station 1710.

The communication protocol between display kiosk 1710 and a customer card is described in more detail in ISO/IEC 7816-3: 1989 (E), Identification cards—Integrated circuit(s) cards with contacts—Part 3: Electronic signals and transmission protocols; and ISO/IEC 7816-3: 1989/Amd.1: 1992 (E), Part 3: Electronic signals and transmission protocols, AMENDMENT 1: Protocol type T=1, synchronous half duplex block transmission protocol. Both of these standards are promulgated by the International Organization for Standardization (ISO) and distributed by the American National Standards Institute (ANSI).

Figure 14A:
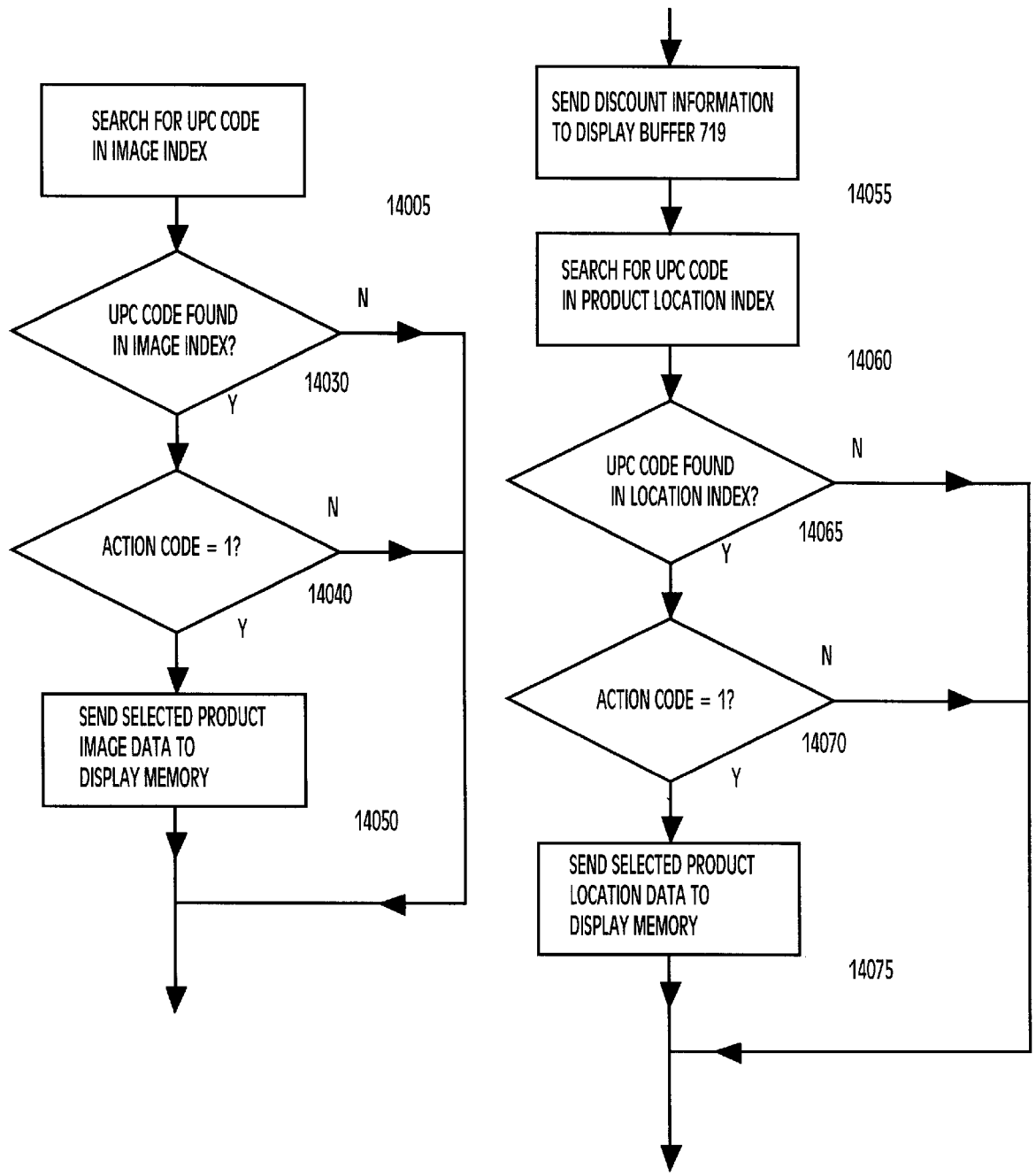
FIGS. 14A and 14B are a flow chart showing a portion of the processing of FIG. 13 in more detail.
Figure 14B:
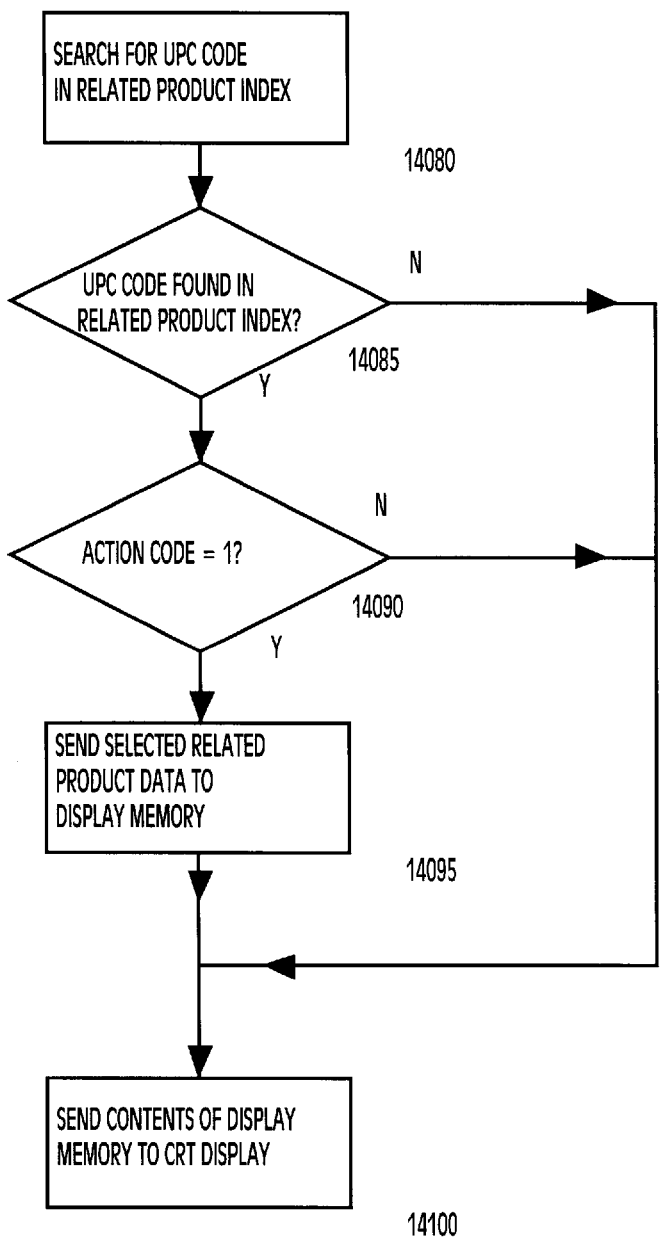

FIGS. 14A and 14B show the processing of step 13040 of FIG. 13 in more detail. To display an entry in table 8435, CPU 1750 searches for the entry's UPC code in image data index 11110. (step 14005). If CPU 1750 finds the UPC code in the image index (step 14030), CPU 1750 determines whether the second field of the found entry is equal to 1(step 14040). If the second field is equal to 1, CPU 1750 uses the third field as a pointer to an image data record 11120 and sends this selected record to video RAM 1735 (step 14050). If CPU 1750 does not find the UPC code in the image index (step 14030) or determines that the second field of the found entry is not equal to 1 (step 14040), CPU 1750 skips step 14050.

CPU 1750 then reads discount information 8435 from the customer card, translates the binary-encoded numerical discount data into character data, translates the character data into graphics data, and sends the graphics data to video RAM 1735 (step 14055).

Next, CPU 1750 searches the product location index 11210 (step 14060) and if the UPC code is found in the location index (step 14065), and the second field of the found entry is 1 (step 14070), CPU 1750 uses the third field of the found entry to point to a selected record of location text 11220. CPU 1750 translates this location text to pixel data and sends the pixel data to video RAM 1735. (step 14075). If the UPC code is not found in the location index (step 14065) or the second field of the found entry is not equal to 1 (step 14070), CPU 1750 skips step 14075.

CPU 1750 then searches for the UPC code in related product index 11310 (step 14080) and if the UPC code is found (step 14085), CPU 1750 reads the second field of the found entry (step 14090) and if the second field is equal to 1, CPU 1750 uses the third field as a pointer to text describing the related product, translates the text to pixel data and sends the pixel data to video RAM 1735 (step 14095). If the UPC code is not found or if the second field of the found entry is not equal to 1 (step 14090), CPU 1750 skips step 14095.

CRT controller 1737 reads video RAM 1735 to generate and send display signals to CRT 1717 (step 14100).

In other words, data structure 11100 stores a certain type of product information (product image data), and data structure 11200 stores two other types of product information (a verbal description of the product and a location of the product). CPU 1750 reads a coupon from the memory of a card, in response to a person inserting the card into slot 1715, and generates, responsive to the coupon, a display signal. CPU 1750 generates the display signal by using the UPC code in the read coupon to access data structure 11100, and by using the UPC code in the read coupon to access data structure 11200.

Figure 15A:
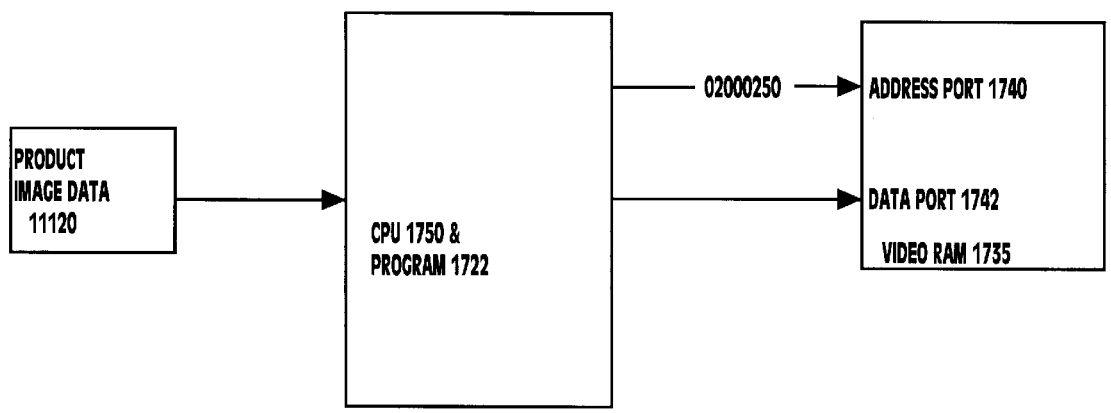
FIGS. 15A, 15B, 15C, and 15D are diagrams showing data paths within the display kiosk during the execution of the processing shown in FIGS. 14A and 14B.

FIGS. 15A, 15B, 15C, and 15D show data flows within display kiosk 1710 during the processing of the method shown in FIGS. 14A and 14B. FIG. 15A shows a data flow during the processing of step 14050. CPU 1750 and program 1722 read a selected record of product image data 11120 and sends data 11120 to data port 1742 of video RAM 1735. CPU 1750 and program 1722 also send an address to address port 1740, to determine where pixels will be displayed on display 1717. As shown in FIG. 15A, the first four digits of the address signal specify the row on display 1717 and the last four digits specify the column on display 1717. Product image data 11120 is displayed beginning at row 0200, column 0250.

Figure 15B:
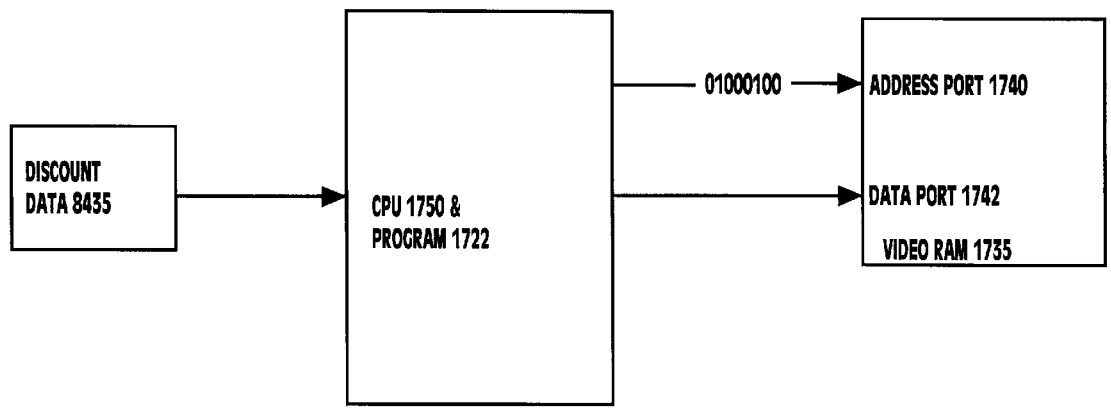

FIG. 15B shows a data flow within display kiosk 1710 when CPU 1750 executes step 14055. CPU 1750 and program 1722 read binary-encoded discount data 8435 from a customer card, translate the discount data to pixel data, and send the pixel data to data port 1742 of video RAM 1735. CPU 1750 and program 1722 also send an address signal 01000100 to address port 1740, to display the discount data beginning at row 100, column 100.

Figure 15C:
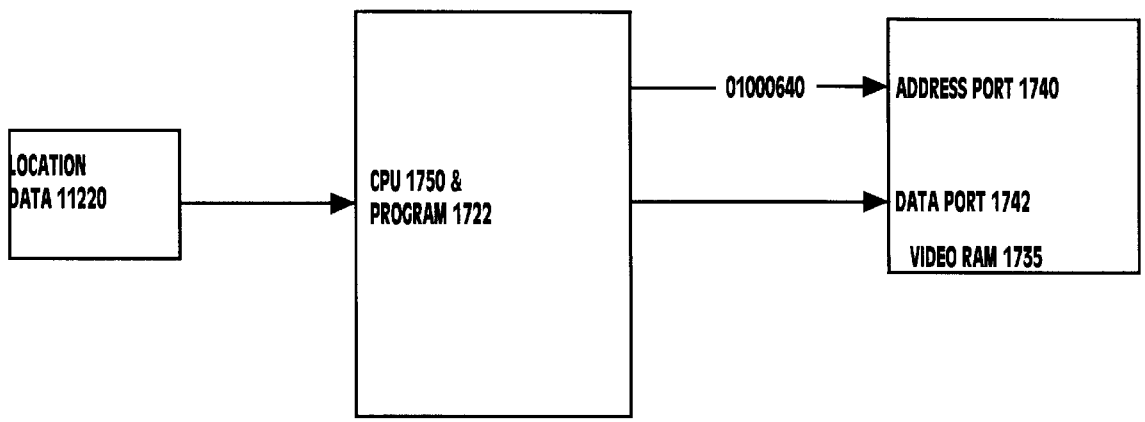

FIG. 15C shows a data flow within display kiosk 1710 when CPU 1750 executes step 14075. CPU 1750 and program 1722 read a selected record of ASCII location data 11220, translate the ASCII data to pixel data, and send the pixel data port 1742 of video RAM 1735. CPU 1750 and program 1722 also send an address signal 01000640 to address port 1740, to display the location data beginning at row 100, column 640.

Figure 15D:
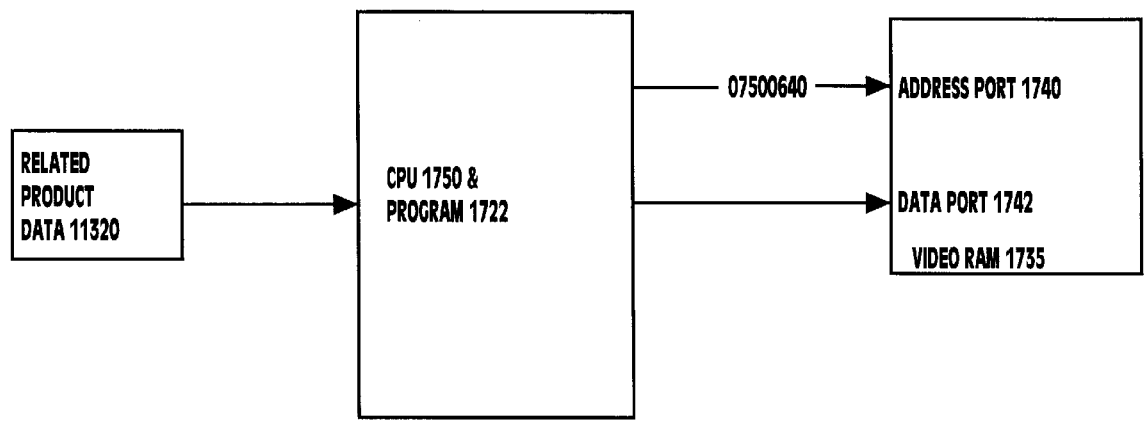

FIG. 15D shows a data flow within display kiosk 1710 when CPU 1750 executes step 14095. CPU 1750 and program 1722 read a selected record of ASCII related product data 11320, translate the ASCII data to pixel data, and send the pixel data port 1742 of video RAM 1735. CPU 1750 and program 1722 also send an address signal 07500640 to address port 1740, to display the related product data beginning at row 750, column 640.

Figure 16:
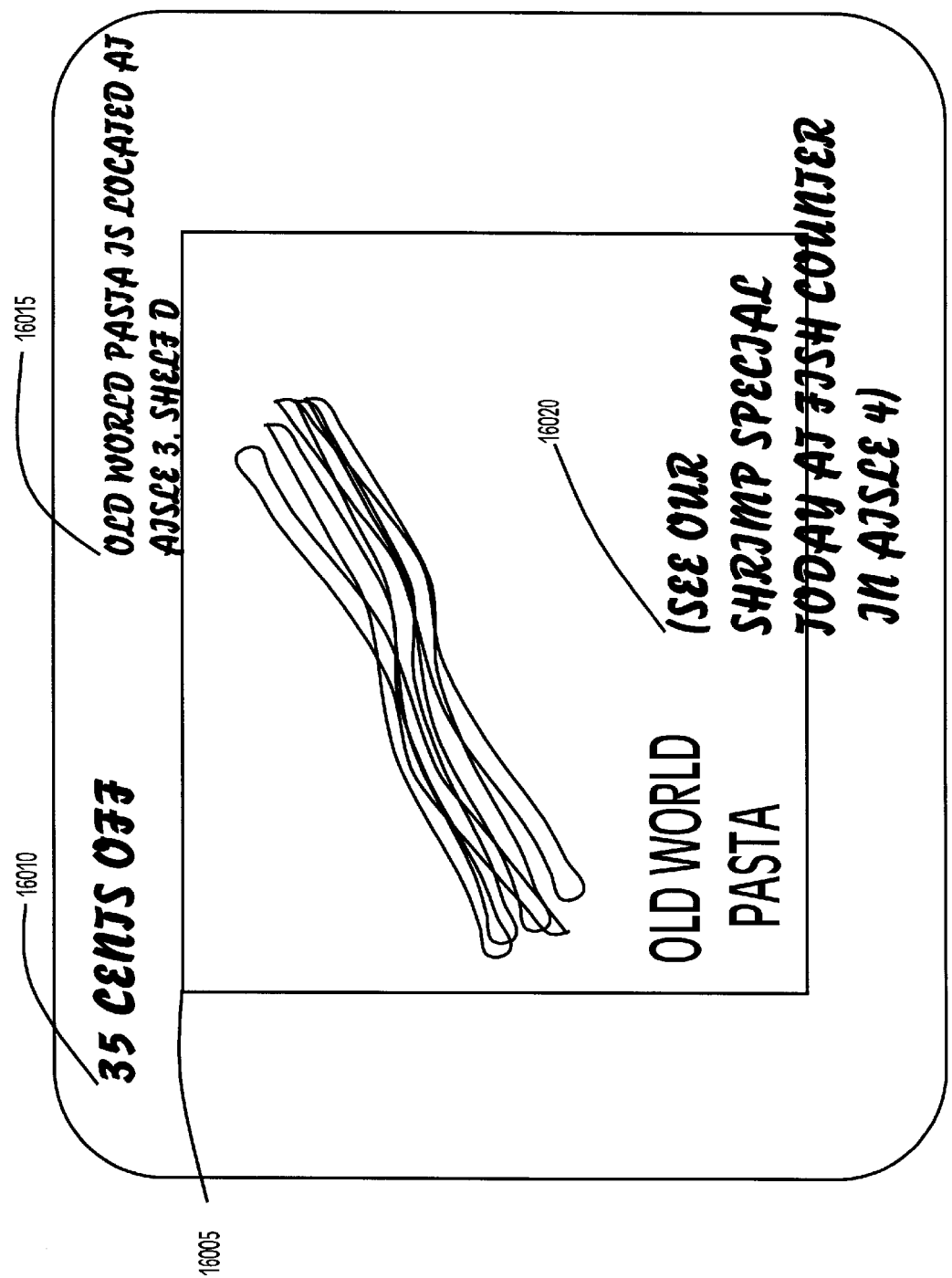
FIG. 16 is a diagram of a CRT display generated by the display kiosk.

FIG. 16 shows a view of the CRT display 1717 after CPU 1750 performs the processing of FIGS. 14A and 14B. Pixel 16005 has coordinates (200, 250), meaning that pixel 16005 is in the row 200, column 250 of CRT display 1717. Pixel 16005 is the upper left of a display region for product image data. Pixel 16010, having coordinates (100, 100), is the upper left of a display region for coupon discount information. Pixel 16015, having coordinates (100, 640), is the upper left of a display region for product location information. Pixel 16020, having coordinates (750, 640), is the upper left of a display region for related product information.

Because the processing of FIGS. 14A and 14B writes the image of the product to video ram 1735 first, and then writes other data, the other data will overwrite some of the image data in video ram 1735. Thus, the other data will appear superimposed over the product image, as shown in FIG. 16.

FIG. 17 shows the result of another processing mode of display kiosk 1710. Display kiosk 1710 uses printer 1752 to print a shopping list onto paper 1754.

Figure 18:
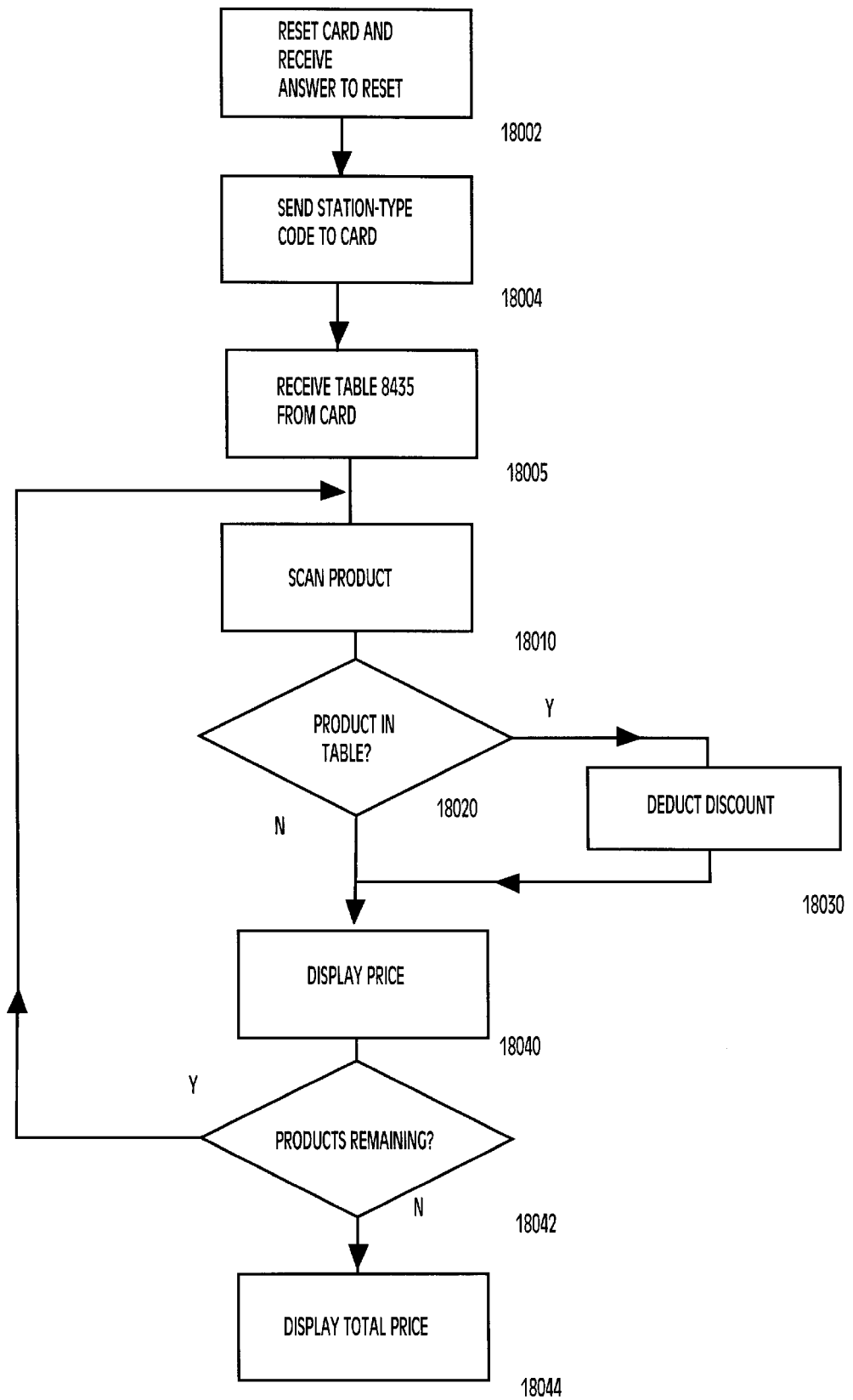
FIG. 18 is a flow chart of a processing performed by the check-out station.

FIG. 18 shows a processing performed by CPU 950 and program 922 in checkout counter 900, when a customer checks out of store 1000. When a customer, such as customer 290, inserts customer card 295 into interface slot 914, a switch (not shown) in interface slot 914 alerts CPU 950 that a card has been inserted into the slot. When a customer card is in interface slot 914, conductive contacts (not shown) inside interface slot 914 touch each card contact 7420. Subsequently, CPU 950 causes card interface 925 to reset the card by applying a clock signal to card contact 7423. (If the card is a customer card, the card then answers the reset by sending a block of data, including identification data 8467 and authorization data 8468, through card contact 7427.) CPU 950 then receives the answer-to-reset from the card (step 18002). CPU 950 then sends a data block containing a station-type code indicating a checkout station (step 18004). CPU 950 then receives the contents of table 8435 in memory 8460 of the customer card, and temporarily stores these table contents in memory 920 of the checkout station (step 18005). During step 18005, CPU 950 also causes customer card 295 to remove all entries from list 8435, so that the electronic coupons in the list cannot be redeemed again. When the checkout clerk (not shown) moves a product past UPC reader 910, UPC reader 910 detects the UPC code on the product and sends the UPC code to CPU 750 (step 18010). CPU 950 searches the received table contents to determine whether the product scanned is identified in the table (step 18020). If the product is in the received table, CPU 950 subtracts the discount, as determined by the discount data stored in the received table, from a product reference price read from disk 925 (step 18030), and displays the resulting price of the product on display 917 (step 18040). If the product is not in the received table (step 18020), CPU 950 skips step 18030. If there are products remaining (step 18042), processing proceeds to step 18010. If there are no products remaining (step 18042), the total price is displayed (step 18044).

Product data, customer identification data 8467, authorization data 8468, and the data in list 8435 are each a type of signal.

In summary, after UPC barcode reader 910 scans a product, processor 950 determines eligibility for a discount. If a product qualifies, processor 950 displays the discounted price on display 917.

Figure 19:
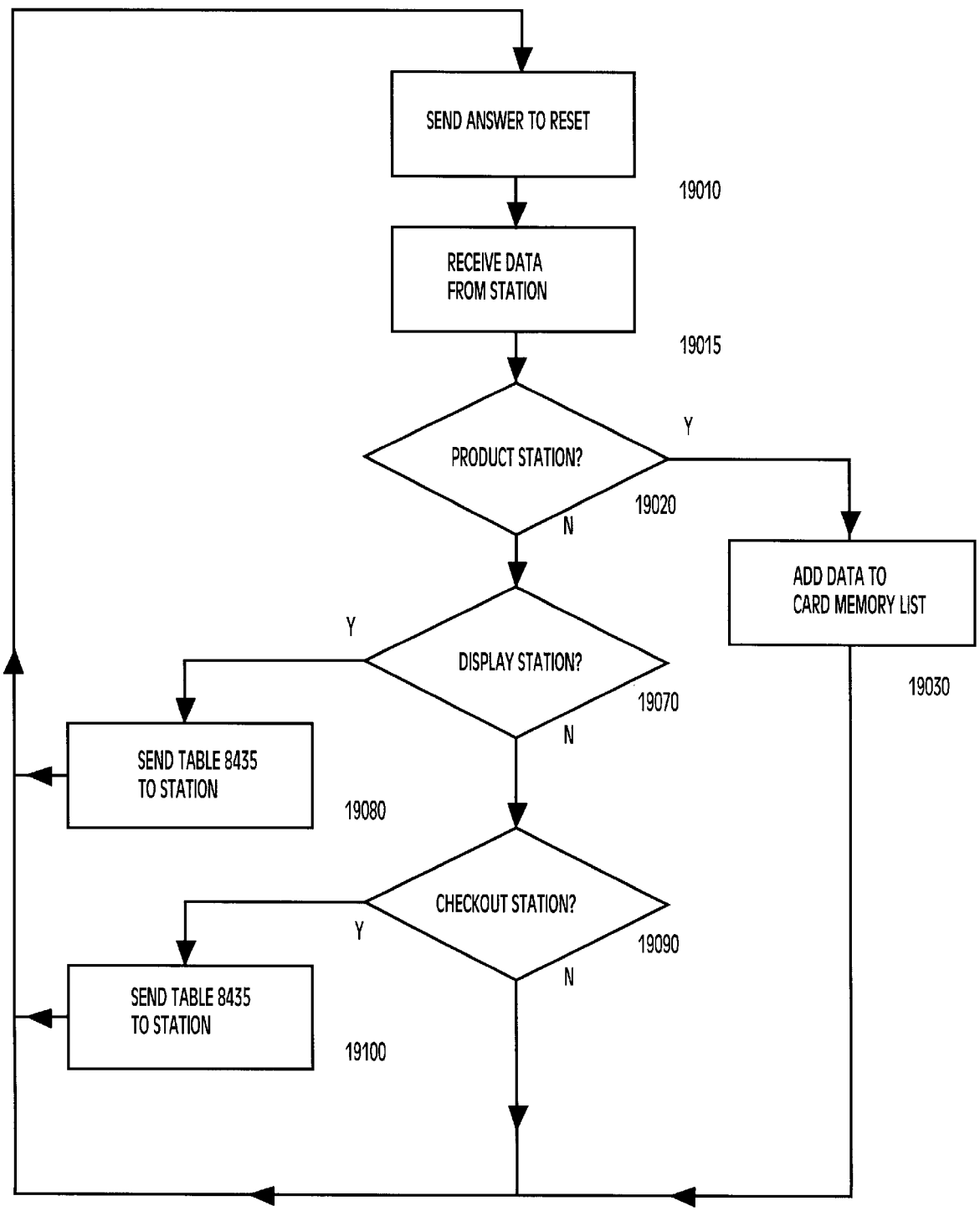
FIG. 19 is a flow chart of a processing performed by one of the customer cards.

FIG. 19 shows a processing performed by one of the customer cards, such as customer card 215, in the preferred retail system. After the card is reset through contacts 2420, the customer card sends an "answer to reset" data block in accordance with the ISO standard ISO/ICE 7816-3: 1989 (E), cited above. The customer card sends identification data 8467 and authorization data 8468 in the answer-to-reset data block (step 19010). If the station then sends a block of data to the customer card, the customer card then receives the block of data through contact 7427 (step 19015). If the block contains a station-type code indicating a product station (step 19020), the customer card then adds product coupon information, from a certain location in the block, to the list 8435 (step 19030). If the block does not contain a station-type code indicating a product station (step 19020), processing proceeds to step 19070.

If the customer card is not eligible, the station will not send a block of data, step 19015 therefore does not execute, and processing ceases until the customer card is reinserted into a station, at which time the station will reset the card and processing will restart at step 19010.

Alternatively, if the block contains a station-type code indicating a display kiosk (step 19070), the customer card then sends list 8435 to the display kiosk (step 19080). In other words, CPU reads list 8435 from memory 8460, in response to a customer inserting card 215 into display kiosk 710, and sends a signal corresponding to the list 8435 to the display kiosk (step 19080).

Alternatively, if the block contains a station-type code indicating a Checkout station (step 19090), the customer card then sends list 8435 to the display kiosk (step 19010). In other words, CPU 2450 reads list 8435 from memory 8460, in response to a customer inserting card 215 into checkout station 915, and sends a signal corresponding to the list 8435 to the checkout station (step 19100).

Figure 20:
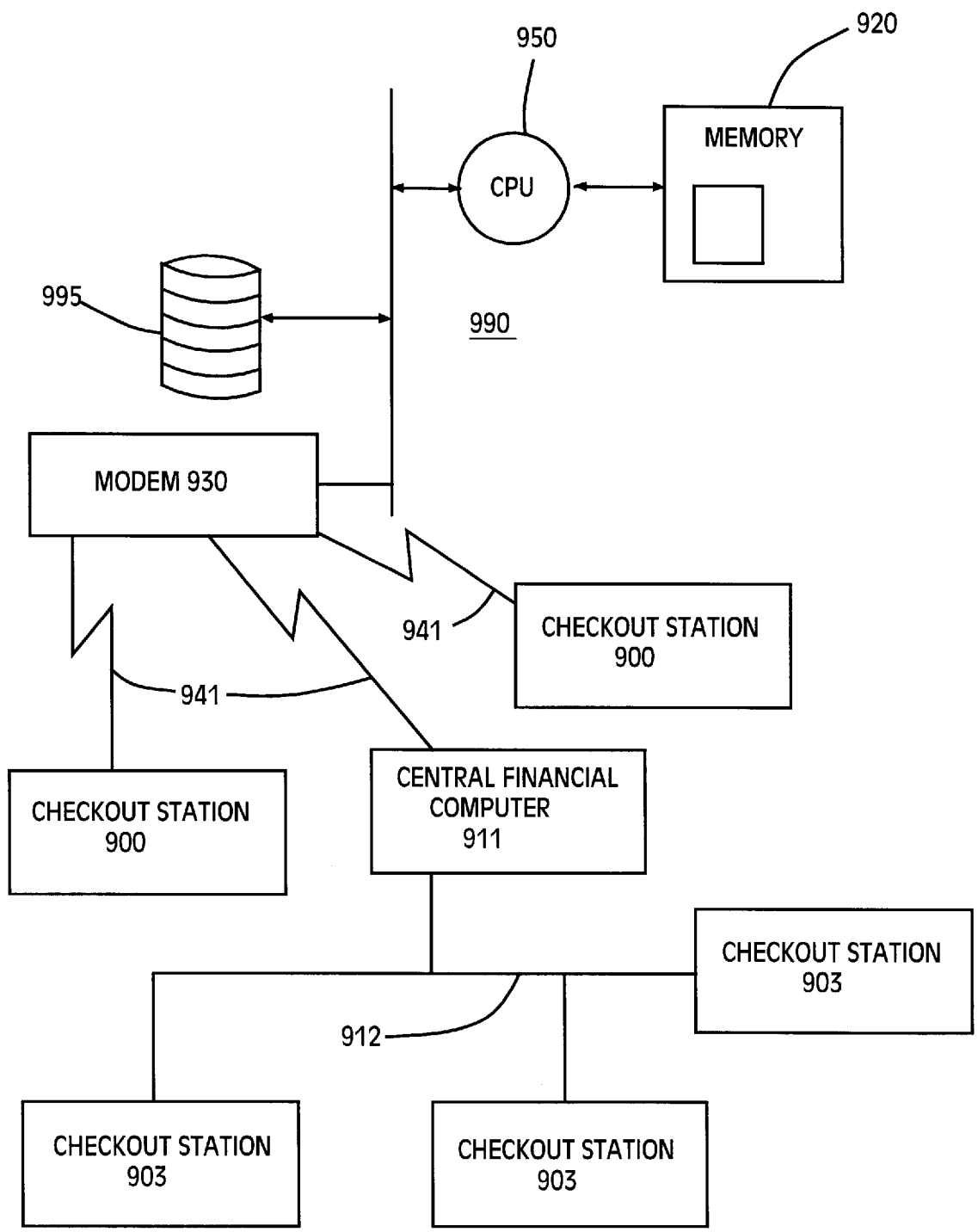
FIG. 20 is a block diagram of a system including a market research center and multiple check-out stations.

FIG. 20 shows a block diagram of a preferred retail system including marketing research center 990, with disk 995, CPU 950, and memory 920. FIG. 20 also shows a plurality of checkout stations 900. Periodically, each checkout station 900 sends a block of data summarizing the redemption transactions. The checkout stations send the data blocks, over telephone lines 941, to research center 990. Checkout stations 903 are located within a single company. Checkout stations 903 are similar to checkout stations 900, described above, except that checkout stations 903 have circuitry for communicating over network 912. Checkout stations 903 send transaction data blocks to central financial computer 911 located within the company. Central financial computer 911 periodically sends the compiled transaction data to market research center 990, over telephone lines 941. Central financial computer 911 also periodically sends clearing house redemption data to an electronic clearing house (not shown), over telephone lines 941.

FIG. 21–26 show a second preferred embodiment of the present invention. The second preferred system has features similar to those of the first preferred system, with additional features described below. In the follow description, elements of the second preferred system corresponding to elements of the first preferred system are labelled with corresponding reference numbers.

Figure 21:
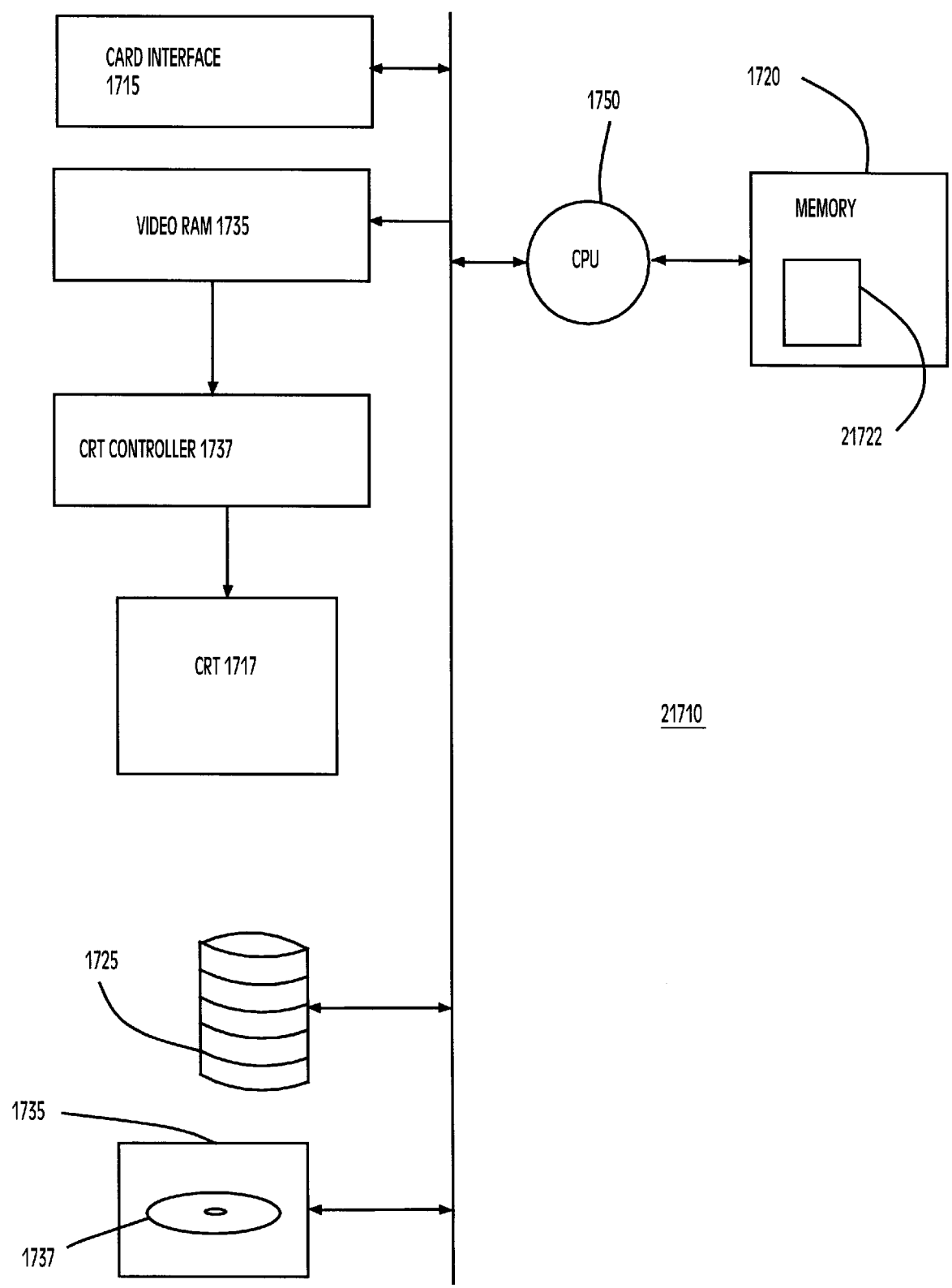
FIG. 21 is a block diagram of a display kiosk in accordance with a second preferred embodiment of the present invention.

FIG. 21 is a block diagram of display kiosk 21710. CPU 1750 executes program 21722, in random access, addressable memory 1720, to display product information reflecting the contents of a customer card. CPU 1750 displays the product information on CRT display 1717, by writing pixel data into video RAM 1735. CRT controller 1737 reads the pixel data from RAM 1737 to send video signals to CRT 1717.

Figure 22B:
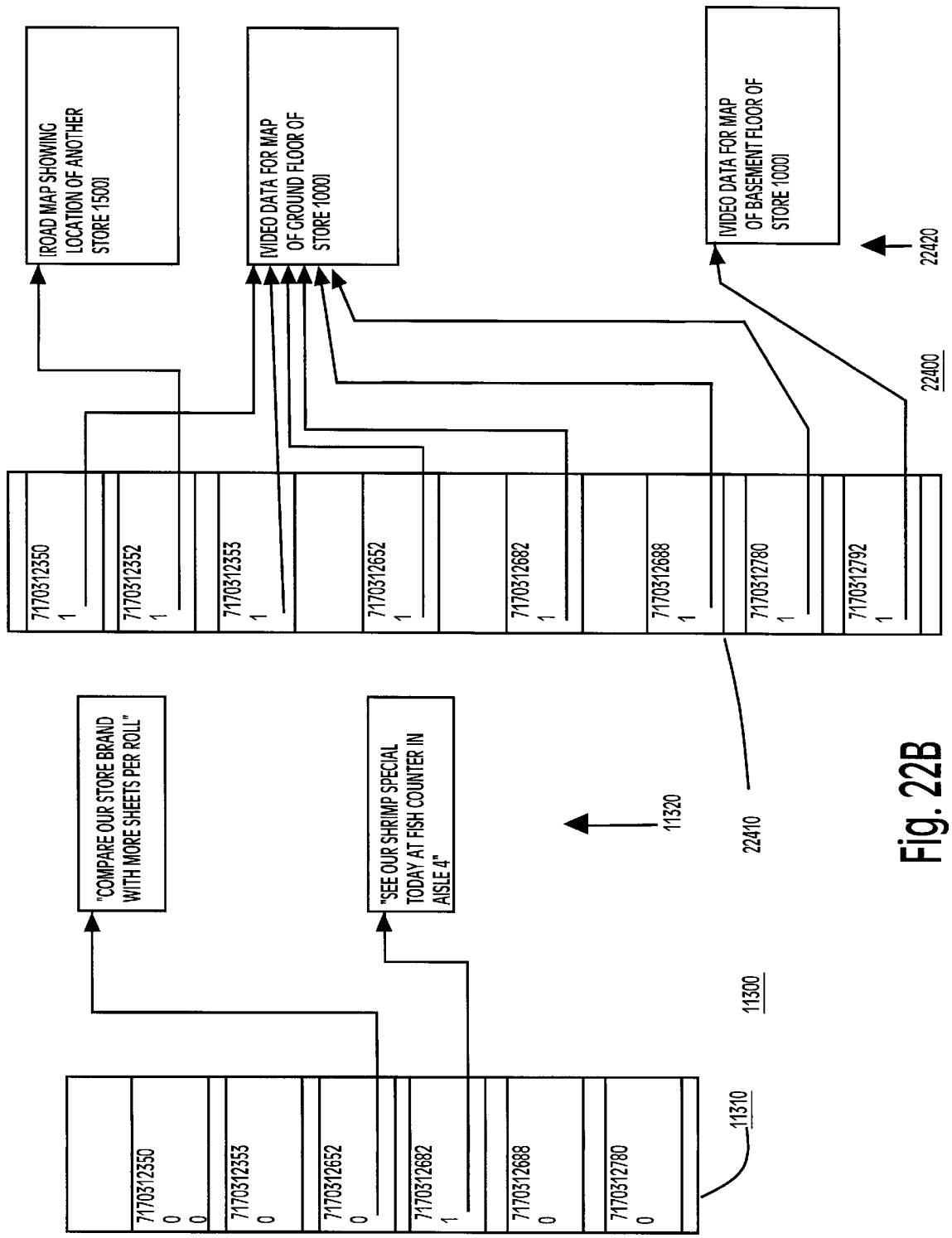

FIGS. 22A, 22B, and 22C show some data structures within the second preferred display kiosk 21710. Structures 11100 and 11200 in FIG. 22A and 11300 in FIG. 22B are described above in connection with the first preferred display kiosk.

In FIG. 22B Structure 22400 contains image data for displaying a map for indicating the spacial location of products corresponding to coupons on a customer card. Structure 22400 normally resides on disk 1725. Structure 22400 includes UPC table 22410, which is a list of entries sorted by UPC code. Each entry in table 22410 includes three fields. A first field is a UPC code; a second field is an action code, described in more detail below; and a third field is a pointer to pixel data for a certain map.

Structure 22400 also includes video data 22420, which is a group of records each containing pixel data for a respective map. CPU 1750 uses the pointer, in the third field of an entry in table 22410, to access a selected record of pixel data in table 22420. In FIG. 22B, multiple pointers point to a common map, the map for the ground floor of store 1000, because the location of multiple products can be indicated on this common map. Another pointer points to a map for the basement floor of store 1000, because the product corresponding to this pointer is located in the basement of store 1000. Another pointer points to a road map indicating the location of a store 1500 (not shown), because the product corresponding to this other pointer is located in store 1500.

In FIG. 22C, table 22510 stores coordinate for displaying a map location of products corresponding to coupons on a customer card. Table 22510 normally resides on disk 1725. Each entry in table 22410 includes four memory fields. A first field is a UPC code, a second field is an action code, a third field is a Y coordinate in the form of a pixel row number for displaying the location of a product, and a fourth field is an X coordinate in the form of a pixel column number for displaying the location of the product.

Figure 23:
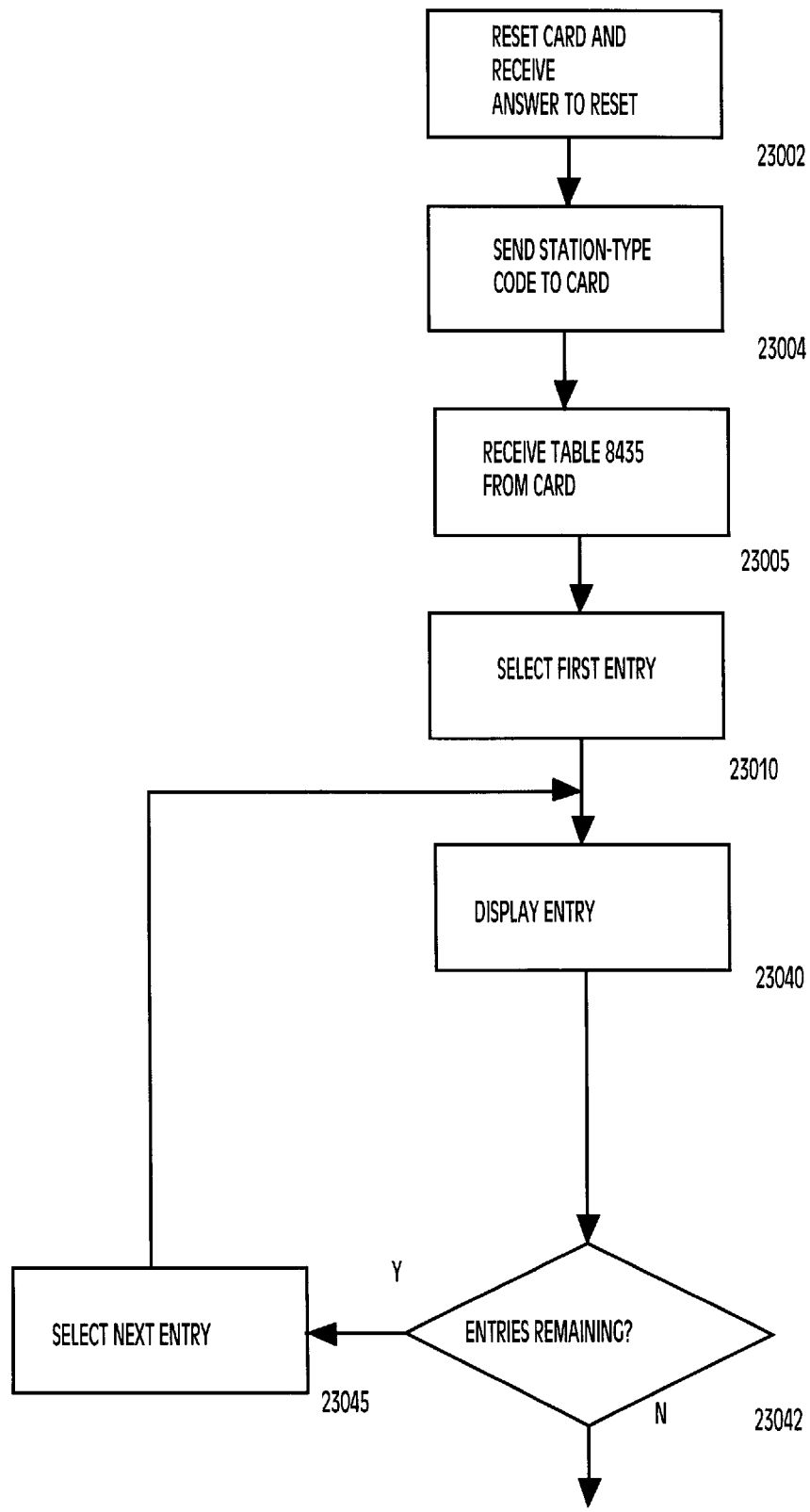
FIG. 23 is a flow chart of a processing performed by the second preferred display kiosk.

FIG. 23 shows a processing performed by CPU 1750 and program 1722 in display kiosk 1710, when a customer inserts a card into card interface 1715. When a customer, such as customer 310, inserts customer card 315 into interface slot 1715, a switch (not shown) in interface slot 1715 alerts CPU 1750 that a card has been inserted into the slot. When a customer card is in interface slot 1715, conductive contacts (not shown) inside interface slot 1715 touch each card contact 7420. Subsequently, CPU 1750 causes card interface 1725 to reset the card by applying a clock signal to card contact 7423. The customer card then answers the reset by sending a block of data, including identification data 8467 and authorization data 8468, through card contact 7427. CPU 1750 then receives the answer-to-reset from the card (step 23002). CPU 1750 then sends a data block containing a station-type code indicating a display kiosk (step 23004). CPU 1750 then receives the contents of table 8435 in memory 8460 of the customer card, and temporarily stores these table contents in memory 1720 of the display kiosk (step 23005). CPU 1750 selects the first entry in table 8435 (step 23010). CPU 1750 displays product and price information for the presently selected entry on display 1717. (Step 23040). If there are entries remaining (step 23042), CPU 1750 selects the next entry in table 8435 (step 23045) and processing proceeds to step 23040. If there are no entries remaining (step 23042), there is no further processing shown in FIG. 23.

Steps 23040, 23042, and 23045 may execute repeatedly without manual intervention. For example, step 23040 may pause for 10 seconds before control passes to the next step. Alternatively, step 23040 may pause until the user presses a button entitled DISPLAY NEXT COUPON (not shown) on station 21710.

Figure 24A:
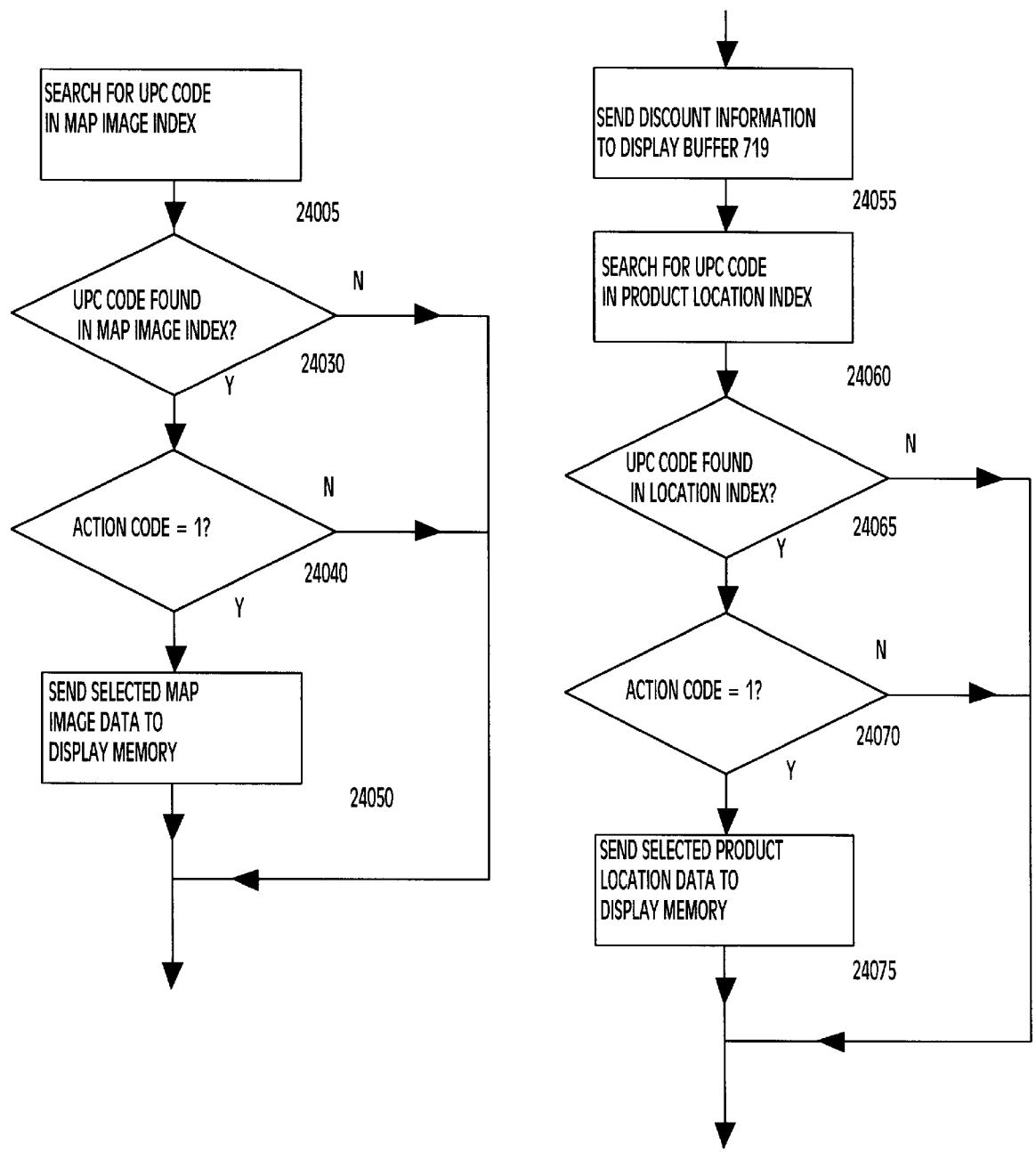
FIGS. 24A and 24B are a flow chart showing a portion of the processing of FIG. 23 in more detail.
Figure 24B:
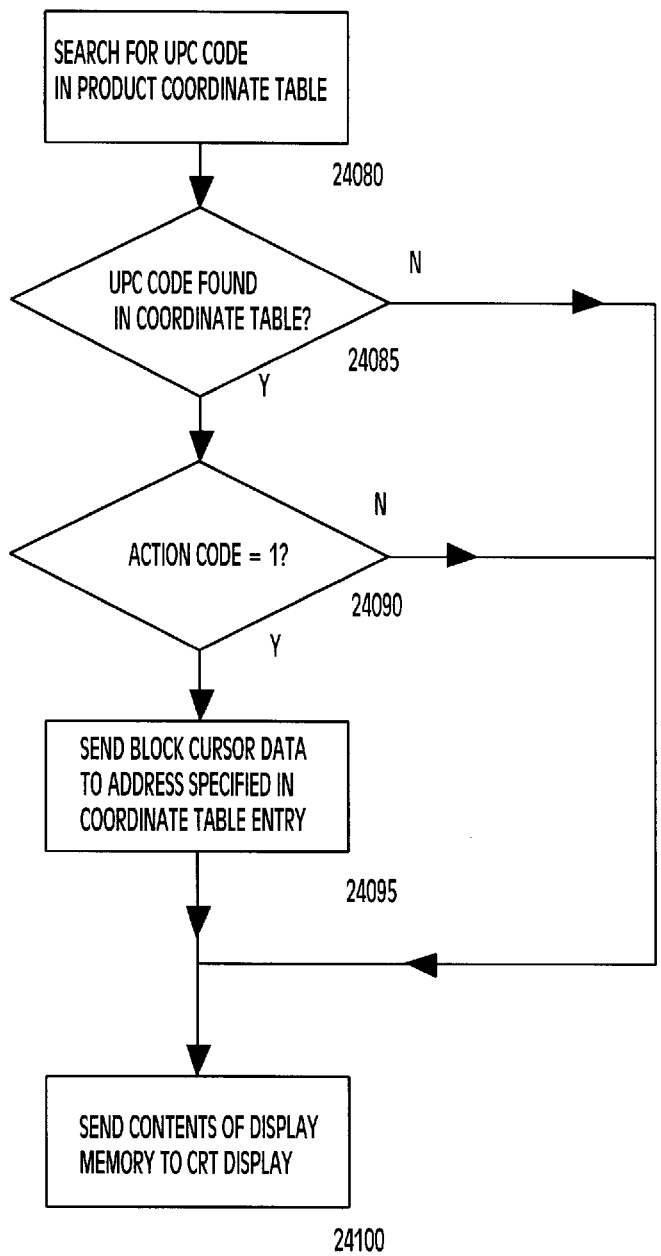

FIGS. 24A and 24B show the processing of step 23040 of FIG. 23 in more detail. To display information for an entry in table 8435, CPU 1750 searches for the entry's UPC code in map image index 22410. (step 24005). If CPU 1750 finds the UPC code in map image index 22410 (step 24030), CPU 1750 determines whether the second field of the found entry is equal to 1 (step 24040). If the second field is equal to 1, CPU 1750 uses the third field as a pointer to a map image record 22420 and sends this selected record to video RAM 1735 (step 24050). If CPU 1750 does not find the UPC code in map image index 22410 (step 24030) or determines that the second field of the found entry is not equal to 1 (step 24040), CPU 1750 skips step 24050.

CPU 1750 then reads discount information 8435 from the customer card, translates the binary-encoded numerical discount data into character data, translates the character data into graphics data, and sends the graphics data to video RAM 1735 (step 24055).

Next, CPU 1750 searches the product location index 11210 (step 24060) and if the UPC code is found in the location index (step 24065), and the second field of the found entry is 1 (step 24070), CPU 1750 uses the third field of the found entry to point to a selected record of location text 11220. CPU 1750 translates this location text to pixel data and sends the pixel data to video RAM 1735. (step 24075). If the UPC code is not found in the location index (step 24065) or the second field of the found entry is not 1 (step 24070), CPU 1750 skips step 24075.

Next, CPU 1750 searches the product coordinate table 22510 (step 24080) and if the UPC code is found in the location index (step 24085), and the second field of the found entry is 1 (step 24090), CPU 1750 uses the third and fourth fields to generate an address signal for video ram 1735. CPU 1750 generates a data signal for video ram 1735 to display a block cursor at a location on CRT 1717 corresponding to the location of the product (step 24095). If the UPC code is not found in the location index (step 24085) or the second field of the found entry is not 1 (step 24090), CPU 1750 skips step 24095.

CRT controller 1737 reads video RAM 1735 to generate and send display signals to CRT 1717 (step 24100).

Figure 25A:
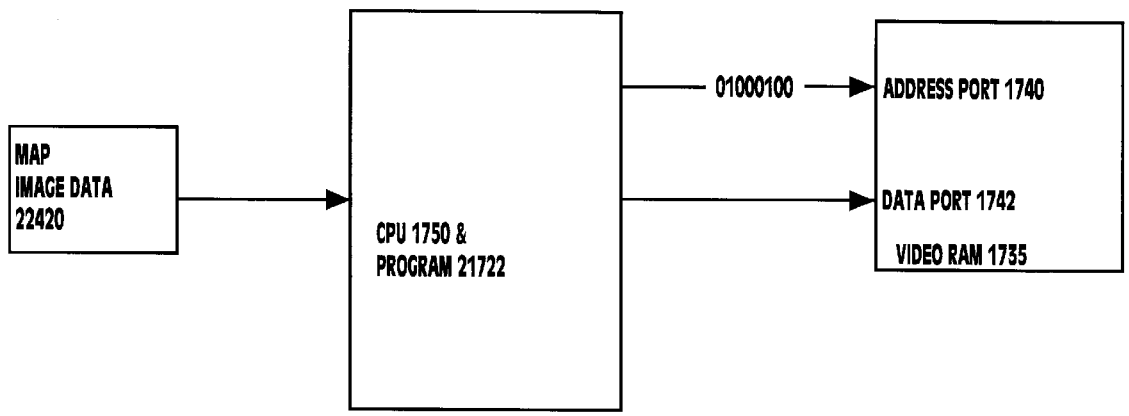
FIGS. 25A, 25B, 25C, and 25D are diagrams showing data paths within the display kiosk during the execution of the processing shown in FIGS. 24A and 24B.

FIGS. 25A, 25B, 25C, and 25D show data flows within display kiosk 1710 during the processing of the method shown in FIGS. 24A and 24B. FIG. 25A shows a data flow during the processing of step 24050. CPU 1750 and program 21722 read a selected record of map image data 22420 and sends data 22420 to data port 1742 of video RAM 1735. CPU 1750 and program 21722 also send an address to address port 1740, to determine where pixels will be displayed on display 1717. As shown in FIG. 25A, the first four digits of the address signal specify the row on display 1717 and the last four digits specify the column on display 1717. Map image data 22420 is displayed beginning at row 0100, column 0100.

Figure 25B:
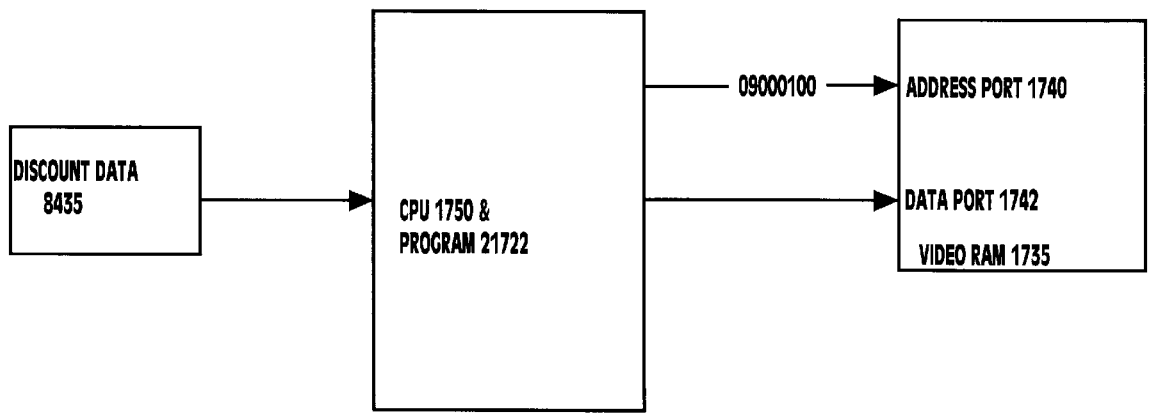

FIG. 25B shows a data flow within display kiosk 21710 when CPU 1750 executes step 24055. CPU 1750 and program 21722 read binary-encoded discount data 8435 from a customer card, translate the discount data to pixel data, and send the pixel data to data port 1742 of video RAM 1735. CPU 1750 and program 21722 also send an address signal 09000100 to address port 1740, to display the discount data beginning at row 900, column 100.

Figure 25C:
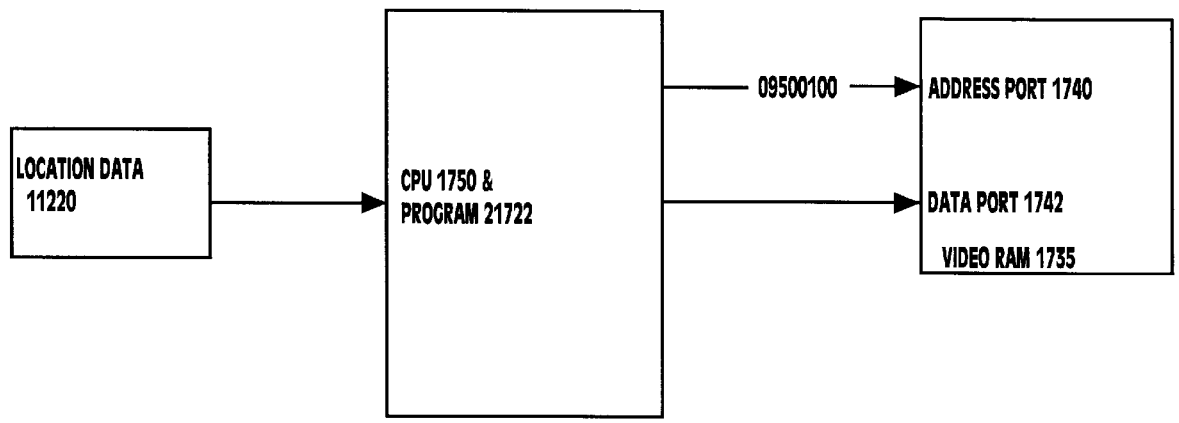

FIG. 25C shows a data flow within display kiosk 21710 when CPU 1750 executes step 24075. CPU 21750 and program 21722 read a selected record of ASCII location data 11220, translate the ASCII data to pixel data, and send the pixel data port 1742 of video RAM 1735. CPU 1750 and program 21722 also send an address signal 09500100 to address port 1740, to display the location text beginning at row 950, column 100.

Figure 25D:
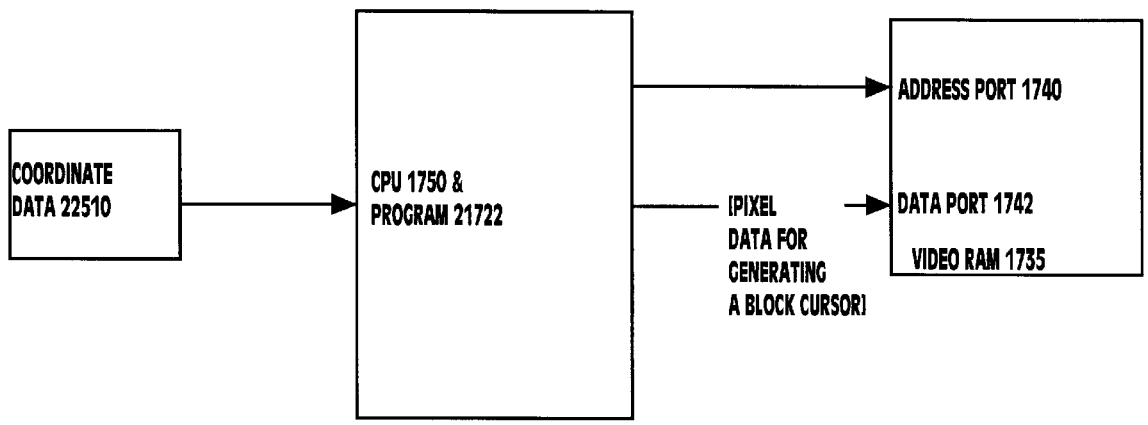

FIG. 25D shows a data flow within display kiosk 1710 when CPU 1750 executes step 24095. CPU 1750 and program 21722 read a the third and fourth fields of an entry in coordinate table 22510 to generate an address signal for address port 1740. CPU 1750 and program 21722 generate a data signal for data port 1742 to generate a block cursor at a CRT display location corresponding to the address signal.

Figure 26:
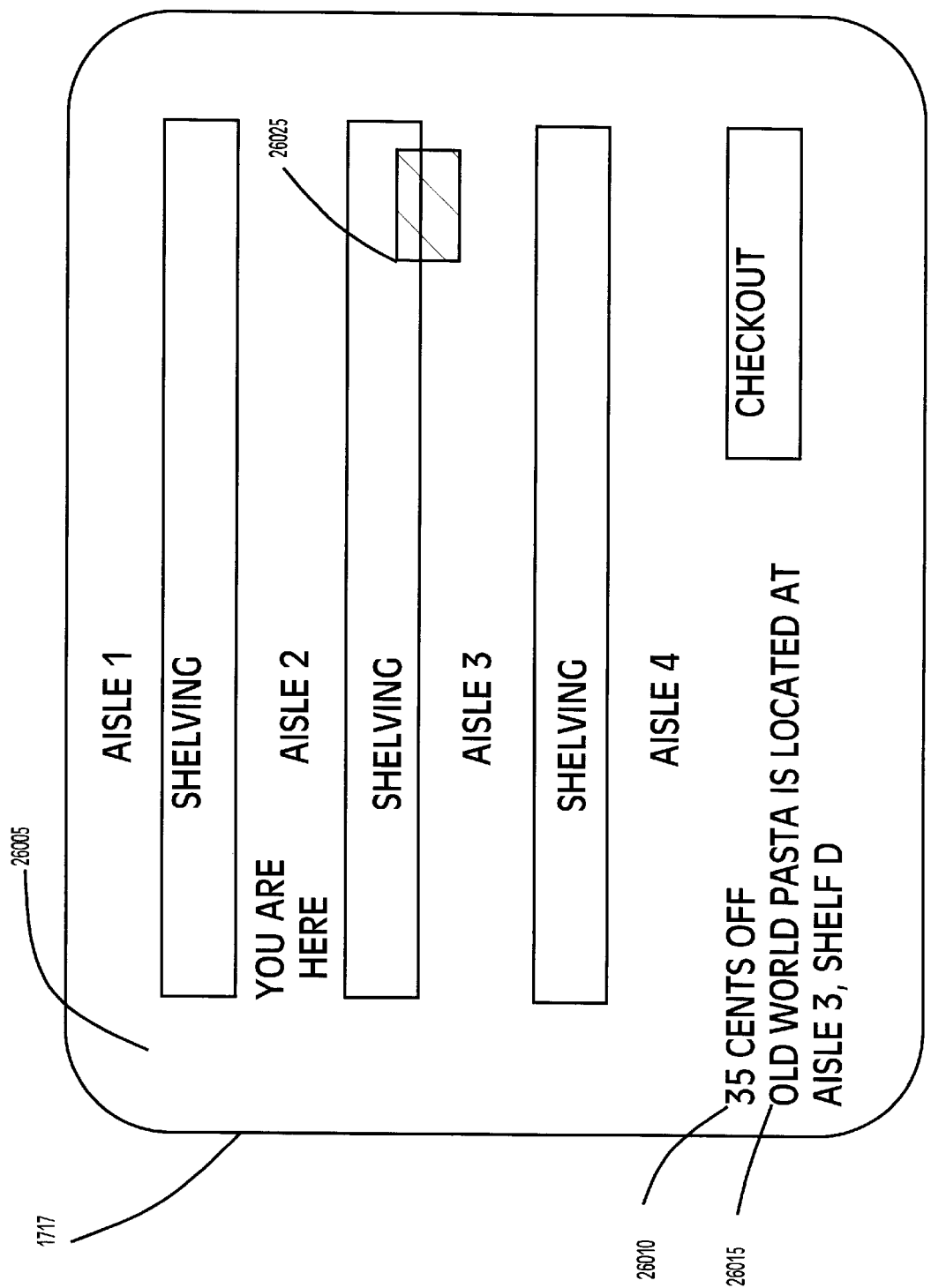
FIG. 26 is a diagram of a CRT display generated by the second preferred display kiosk.

FIG. 26 shows a view of the CRT display 1717 after CPU 1750 performs the processing of FIGS. 24A and 24B. Pixel 26005 has coordinates (100, 100), meaning that pixel 26005 is in the row 100, column 100 of CRT display 1717. Pixel 26005 is the upper left of a display region for map image data. Pixel 26010, having coordinates (900, 100), is the upper left of a display region for coupon discount information. Pixel 26015, having coordinates (950, 100), is the upper left of a display region for product location information. Pixel 26025, having coordinates (400,950), is the upper left of a display region for the block cursor when the block cursor is identifying the spacial location of Old World Pasta.

Thus, the preferred systems provide a convenient and stimulating shopping environment that allows the user to conveniently review the coupons stored on a customer card.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. In a system including a communication device and a plurality of portable cards each having a memory, a method of operating the system comprising the steps of:

reading a first signal from the memory of a card in the plurality of cards, in response to a person presenting the card at the communication device, the first signal corresponding to a product;

generating, responsive to the first signal, a second signal containing an image of the product; and displaying the second signal.

2. The method of claim 1 further including receiving a third signal corresponding to a product; and determining a price for the product depending on whether the first signal corresponds to the third signal.

3. The method of claim 1 wherein the system includes a cathode ray tube (CRT), and displaying step includes displaying the second signal on the CRT.

4. The method of claim 1 wherein the system includes a printer for printing on a substrate, and wherein the displaying step includes printing, using the printer, the second signal on the substrate.

5. The method of claim 1 wherein the reading step includes reading a first signal corresponding to pricing information for a product.

6. The method of claim 1 wherein the system further includes an electronic display, and the displaying step includes displaying the second signal on the electronic display.

7. The method of claim 1 wherein the displaying step includes displaying other information about the product with the image of the product.

8. The method of claim 1 wherein the displaying step includes displaying a verbal description of the product with the image of the product.

9. The method of claim 1 wherein the displaying step includes displaying a location of the product with the image of the product.

10. The method of claim 1 wherein the displaying step includes displaying pricing information for the product with the image of the product.

11. A retail system comprising:

a plurality of portable cards each having a card memory;

a communication device;

first memory for storing a signal containing an image of a product;

a reader that reads a first signal from the card memory of a card in the plurality of cards, in response to a person presenting the card at the communication device, the first signal corresponding to a product;

a generator for accessing the first memory, using the first signal, to generate a second signal; and a display for displaying the second signal.

12. The system of claim 11 wherein each portable card includes a card memory for storing a first signal corresponding to pricing information for a product.

13. The system of claim 11 further including a receiver means for receiving a third signal corresponding to a product; and a determiner means for determining a price for the product depending on whether the first signal corresponds to the third signal.

14. The system of claim 11 wherein the display includes an electronic display.

15. The system of claim 11 wherein the display includes a cathode ray tube.

16. The system of claim 11 wherein the display includes a printer.

17. The system of claim 11 wherein the generator includes circuitry that generates a second signal containing the image of the product and other information about the product.

18. The system of claim 11 wherein the generator includes circuitry that generates a second signal containing the image of the product and a verbal description of the product.

19. The system of claim 11 wherein the generator includes circuitry that generates a second signal containing the image of the product and a location of the product.

20. The system of claim 11 wherein the generator includes circuitry that generates a second signal containing the image of the product and pricing information for the product.

21. In a system including a plurality of portable cards each having a memory, a first communication device, and a checkout area having a second communication device, a method of operating the system comprising the steps of:

a first reading step of reading a first signal from the memory of a card in the plurality of cards, in response to a person presenting the card at the communication device, the first signal corresponding to a product;

generating, responsive to the first signal, a second signal containing an image of the product;

displaying the second signal;

a second reading step of reading the first signal from the memory of the card, in response to a person presenting the card at the second communication device;

receiving a third signal corresponding to a product; and determining a price for the product depending on whether the first signal, read in the second reading step, corresponds to the third signal.

22. The method of claim 21 wherein the system includes a cathode ray tube (CRT), and displaying step includes displaying the second signal on the CRT.

23. The method of claim 21 wherein the system includes a printer for printing on a substrate, and wherein the method includes printing, using the printer, the second signal on the substrate.

24. The method of claim 21 wherein the second reading step includes reading a first signal corresponding to pricing information for a product.

25. The method of claim 21 wherein the system further includes an electronic display, and the displaying step includes displaying the second signal on the electronic display.

26. The method of claim 21 wherein the displaying step includes displaying other information about the product with the image of the product.

27. The method of claim 21 wherein the displaying step includes displaying a verbal description of the product with the image of the product.

28. The method of claim 21 wherein the displaying step includes displaying a location of the product with the image of the product.

29. The method of claim 21 wherein the displaying step includes displaying pricing information for the product with the image of the product.

30. In a system including a plurality of product areas, a plurality of portable cards each having a memory, a first communication device, and a checkout area having a second communication device, a method of operating the system comprising the steps of:

reading a first signal from the memory of a card in the plurality of cards, in response to a person presenting the card at the first communication device, the first signal corresponding to a product in one of the product areas;

displaying, responsive to the first signal, an image of the product;

removing the product from one of the product areas; and reading the first signal from the memory of the card, in response to a person presenting the card at the second communication device.

31. The method of claim 30 wherein the reading step includes reading a first signal corresponding to pricing information for a product.

32. The method of claim 30 wherein the system further includes an electronic display, and the displaying step includes displaying on the electronic display.

33. The method of claim 30 wherein the system further includes a cathode ray tube (CRT), and displaying step includes displaying on the CRT.

34. The method of claim 30 wherein the system further includes a printer for printing on a substrate, and wherein the displaying step includes using the printer to display on the substrate.

35. The method of claim 30 wherein the displaying step includes displaying other information about the product with the image of the product.

36. The method of claim 30 wherein the displaying step includes displaying a verbal description of the product with the image of the product.

37. The method of claim 30 wherein the displaying step includes displaying a location of the product with the image of the product.

38. The method of claim 30 wherein the displaying step includes displaying pricing information for the product with the image of the product.

\* \* \* \* \*